US 11,838,103 B2

(12) United States Patent
Watanabe et al.

(10) Patent No.: US 11,838,103 B2
(45) Date of Patent: Dec. 5, 2023

(54) WAVELENGTH CONVERSION DEVICE AND TRANSMISSION SYSTEM

(71) Applicant: FUJITSU LIMITED, Kawasaki (JP)

(72) Inventors: Tomoaki Watanabe, Kawasaki (JP); Yoshinobu Matsukawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/747,493

(22) Filed: May 18, 2022

(65) Prior Publication Data

US 2023/0024263 A1 Jan. 26, 2023

(30) Foreign Application Priority Data

Jul. 26, 2021 (JP) ................................. 2021-121220

(51) Int. Cl.
*H04J 14/02* (2006.01)
*H04B 10/50* (2013.01)
(Continued)

(52) U.S. Cl.
CPC .... *H04J 14/0221* (2013.01); *H04B 10/07955* (2013.01); *H04B 10/506* (2013.01);
(Continued)

(58) Field of Classification Search
CPC .. H04J 14/0221; H04J 14/021; H04J 14/0201; H04J 14/0213; H04B 10/07955;
(Continued)

(56) References Cited

U.S. PATENT DOCUMENTS 7,924,499 B2\* 4/2011 Inagaki ............... H01S 3/06758
359/337.4
2003/0025965 A1\* 2/2003 Takatsu ............... G06F 13/4022
398/79
(Continued)

FOREIGN PATENT DOCUMENTS

JP 2007-104103 4/2007
JP 2012-205172 10/2012
JP 2020-88642 6/2020

*Primary Examiner* — Hibret A Woldekidan
(74) *Attorney, Agent, or Firm* — STAAS & HALSEY LLP

(57) ABSTRACT

A wavelength conversion device includes: a memory; and a processor configured to: receive transmission signal light in which first wavelength division multiplexing signal light and second wavelength division multiplexing signal light that have different wavelength bands in which a plurality of rays of main signal light is wavelength-multiplexed are combined with supervisory control signal light that relates to supervisory control of the first wavelength division multiplexing signal light and the second wavelength division multiplexing signal light from a transmission line and that demultiplexes the supervisory control signal light from the transmission signal light; detect input power of the supervisory control signal light; demultiplexer each of the first wavelength division multiplexing signal light and the second wavelength division multiplexing signal light from the transmission signal light; convert at least one of the wavelength bands of the first wavelength division multiplexing signal light and the second wavelength division multiplexing signal light.

14 Claims, 10 Drawing Sheets

(51) Int. Cl.
*H04B 10/61* (2013.01)
*H04B 10/079* (2013.01)
*H04B 10/572* (2013.01)

(52) U.S. Cl.
CPC ......... *H04B 10/572* (2013.01); *H04B 10/616* (2013.01); *H04J 14/021* (2013.01)

(58) Field of Classification Search
CPC .. H04B 10/506; H04B 10/572; H04B 10/616; H04B 10/564; H04B 10/077; H04B 10/0775; H04B 10/0773; H04B 10/0779
USPC ....... 398/79, 82, 83, 25, 30, 32, 38, 94, 197
See application file for complete search history.

(56) References Cited

U.S. PATENT DOCUMENTS

| | | | |
|---|---|---|---|
| 2006/0018658 A1* | 1/2006 | Mori | H04J 14/0221 398/79 |
| 2006/0139742 A1* | 6/2006 | Frankel | H04J 14/0246 359/333 |
| 2007/0077073 A1* | 4/2007 | Shimada | H04B 10/296 398/158 |
| 2008/0080865 A1* | 4/2008 | Muro | H04J 14/0204 398/83 |
| 2008/0260386 A1* | 10/2008 | Boduch | H04J 14/0213 398/83 |
| 2020/0169795 A1* | 5/2020 | Yuki | H04J 14/0227 |

* cited by examiner

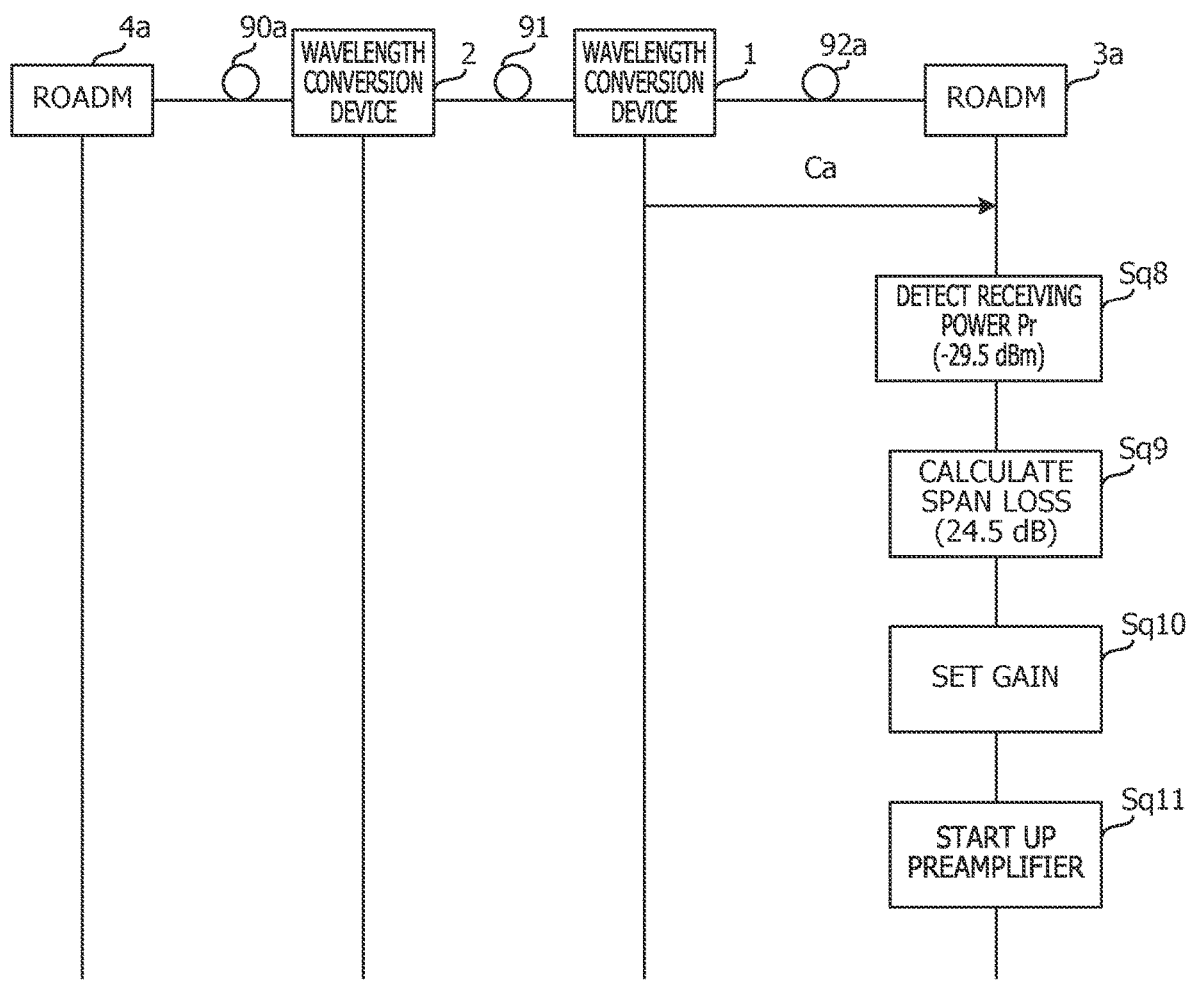

WAVELENGTH CONVERSION DEVICE AND TRANSMISSION SYSTEM

CROSS-REFERENCE TO RELATED APPLICATION

This application is based upon and claims the benefit of priority of the prior Japanese Patent Application No. 2021-121220, filed on Jul. 26, 2021, the entire contents of which are incorporated herein by reference.

FIELD

The embodiments discussed herein are related to a wavelength conversion device and a transmission system.

BACKGROUND

With the increase in a communication demand, increasing a transmission capacity of wavelength division multiplexing (WDM) has been in demand. For example, in the case of performing transmission using only wavelength division multiplexing signal light of a conventional (C) band, its wavelength band is limited to 1530 to 1565 (nm).

Japanese Laid-open Patent Publication No. 2020-88642 is disclosed as related art.

SUMMARY

According to an aspect of the embodiments, a wavelength conversion device includes: a memory; and a processor coupled to the memory and configured to: receive transmission signal light in which first wavelength division multiplexing signal light and second wavelength division multiplexing signal light that have different wavelength bands in which a plurality of rays of main signal light is wavelength-multiplexed are combined with supervisory control signal light that relates to supervisory control of the first wavelength division multiplexing signal light and the second wavelength division multiplexing signal light from a transmission line and that demultiplexes the supervisory control signal light from the transmission signal light; detect input power of the supervisory control signal light; demultiplexes each of the first wavelength division multiplexing signal light and the second wavelength division multiplexing signal light from the transmission signal light; convert at least one of the wavelength bands of the first wavelength division multiplexing signal light and the second wavelength division multiplexing signal light; convert the supervisory control signal light into an electrical signal; acquire a first information signal and a second information signal that contain supervisory control information of the first wavelength division multiplexing signal light and the second wavelength division multiplexing signal light, respectively, from the electrical signal; convert the first information signal into first information signal light; convert the second information signal into second information signal light; attenuate the first information signal light; attenuate the second information signal light; combine the first information signal light attenuated by the first variable optical attenuator and the first wavelength division multiplexing signal light, and outputs the combined first information signal light and first wavelength division multiplexing signal light to a receiving device; combine the second information signal light attenuated by the second variable optical attenuator and the second wavelength division multiplexing signal light, and outputs the combined second information signal light and second wavelength division multiplexing signal light to another receiving device; and calculate a power loss of the supervisory control signal light within the transmission line from the input power of the supervisory control signal light, and sets an attenuation amount based on the power loss of the supervisory control signal light in each of the first variable optical attenuator and the second variable optical attenuator.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a sequence diagram (part 2) illustrating an example of a span loss measurement process in the transmission system.

DESCRIPTION OF EMBODIMENTS

Figure 1:
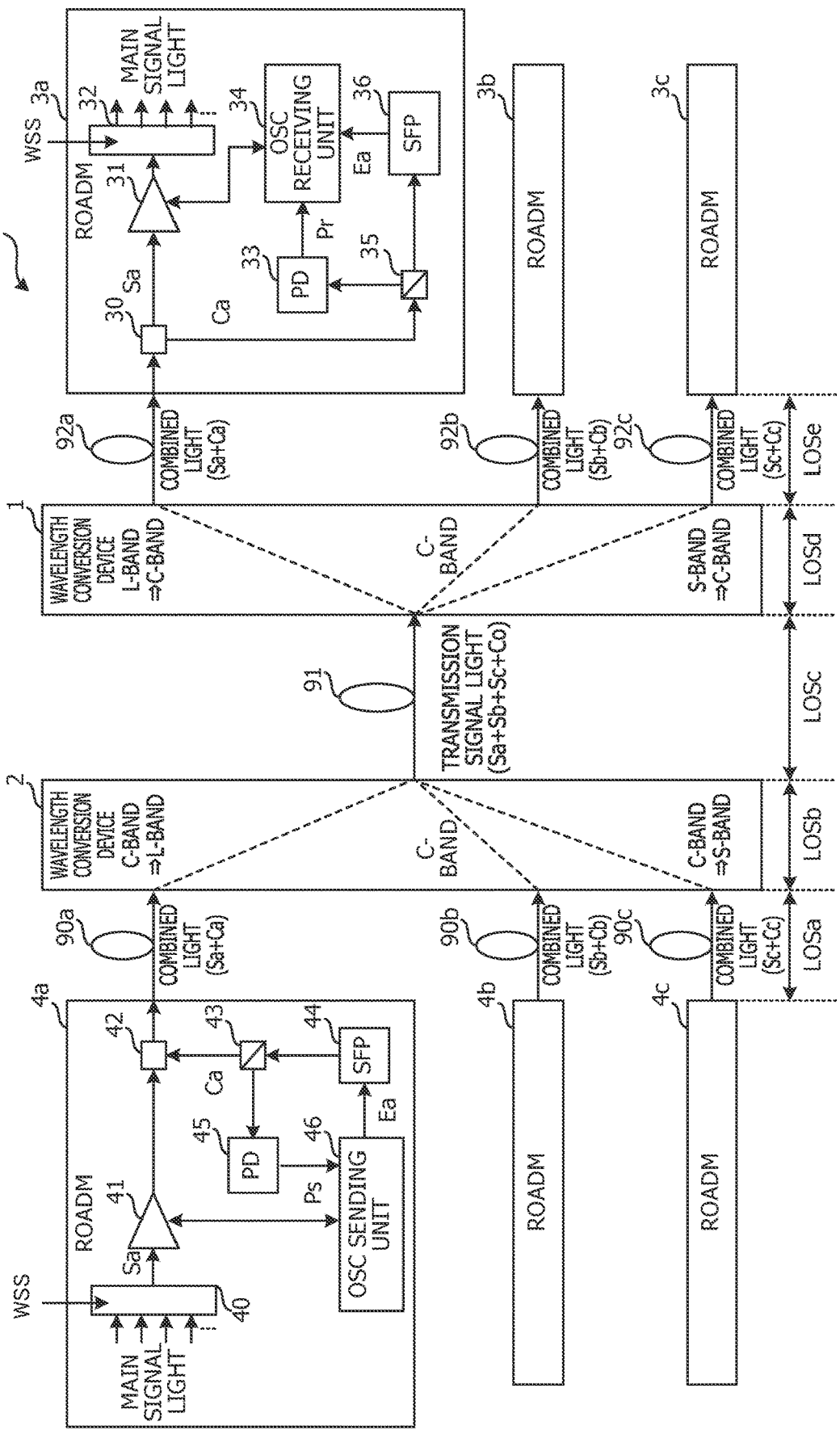
FIG. 1 is a configuration diagram illustrating an example of a transmission system for wavelength division multiplexing signal light.

Therefore, for example, studies are being conducted on increasing the transmission capacity of WDM by extending the wavelength band to a long (L) band of 1565 to 1625 (nm) and a short (S) band of 1460 to 1530 (nm). For example, there is disclosed a wavelength conversion system that combines and transmits respective rays of wavelength division multiplexing signal light of the C-band, L-band, and S-band by converting the wavelength division multiplexing signal light of the C-band into the wavelength division multiplexing signal light of the L-band and S-band.

Supervisory control signal light such as optical supervisory channel (OSC) signal light containing supervisory control information on each ray of the wavelength division multiplexing signal light is combined in each ray of the wavelength division multiplexing signal light of C-band, L-band, and S-band. In the above wavelength conversion system, in order to narrow the band occupied by the supervisory control signal light, after separately converting the supervisory control signal light in each of the C-band, L-band, and S-band wavelength bands into electrical data signals and multiplexing the converted data signals into one data signal, the multiplexed data signal is converted into an optical signal, and the converted optical signal is combined with the combined light of each ray of the wavelength division multiplexing signal light.

For example, a wavelength division multiplexing transmission device such as a reconfigurable optical add/drop multiplexer (ROADM) includes a preamplifier that amplifies wavelength division multiplexing signal light received from another wavelength division multiplexing transmission device. The preamplifier is capable of switching the magnitude of the gain according to the power loss (span loss) of the wavelength division multiplexing signal light.

The wavelength division multiplexing transmission device determines the gain of the preamplifier at startup before the transmission of the wavelength division multiplexing signal light is started. For this purpose, the wavelength division multiplexing transmission device measures the power loss of the supervisory control signal light in advance and switches the magnitude of the gain of the preamplifier, based on the power loss of the supervisory control signal light.

However, when respective wavelength division multiplexing transmission devices on the sending side and the receiving side send and receive the wavelength division multiplexing signal light via the above wavelength conversion system, the supervisory control signal light is once converted into the electrical data signal and then converted into an optical signal again in the wavelength conversion system before being sent to the wavelength division multiplexing transmission device on the receiving side. Therefore, the supervisory control signal light having a smaller power loss than the power loss of the wavelength division multiplexing signal light is input to the wavelength division multiplexing transmission device on the receiving side. In this case, since the wavelength division multiplexing transmission device is not able to set an appropriate gain in the preamplifier, the transmission quality of the wavelength division multiplexing signal light deteriorates.

Accordingly, the wavelength division multiplexing transmission device is not allowed to measure the power loss of the wavelength division multiplexing signal light with the supervisory control signal light.

Thus, it is an object of the present embodiments to provide a wavelength conversion device and a transmission system capable of measuring the power loss of wavelength division multiplexing signal light with supervisory control signal light.

(Configuration of Transmission System)

FIG. 1 is a configuration diagram illustrating an example of a transmission system 9 for wavelength division multiplexing signal light Sa to Sc. The transmission system 9 includes ROADMs 4a to 4c on a sending side, a wavelength conversion device 2 on the sending side, a wavelength conversion device 1 on a receiving side, and ROADMs 3a to 3c on the receiving side. Note that another wavelength division multiplexing transmission device may be used instead of the ROADMs 3a to 3c and 4a to 4c.

The ROADMs 4a to 4c are connected to the wavelength conversion device 2 via transmission lines 90a to 90c such as optical fibers. The ROADM 4a sends the combined light of the wavelength division multiplexing signal light Sa and the supervisory control signal light Ca to the wavelength conversion device 2. The ROADM 4b sends the combined light of the wavelength division multiplexing signal light Sb and the supervisory control signal light Cb to the wavelength conversion device 2. The ROADM 4c sends the combined light of the wavelength division multiplexing signal light Sc and the supervisory control signal light Cc to the wavelength conversion device 2.

A plurality of rays of main signal light having wavelengths different from each other is wavelength-multiplexed in each ray of the wavelength division multiplexing signal light Sa to Sc. The wavelength bands of the wavelength division multiplexing signal light Sa to Sc sent and received by the ROADMs 4a to 4c and 3a to 3c are, for example, the C-band. Note that, in the present example, the case of transmitting the wavelength division multiplexing signal light Sa to Sc of three wavelength bands will be mentioned, but the present embodiments are not limited to this example. The wavelength division multiplexing signal light of four or more wavelength bands may be transmitted, and the wavelength band is not also limited to the C-band.

The supervisory control signal light Ca to Cc contains supervisory control information regarding the wavelength division multiplexing signal light Sa to Sc, respectively. The wavelength bands of the supervisory control signal light Ca to Cc are different from the wavelength bands of the wavelength division multiplexing signal light Sa to Sc and are, for example, the S-band. The supervisory control signal light includes optical supervisory channel (OSC) light, but is not limited to this.

The combined light of the wavelength division multiplexing signal light Sa to Sc and the supervisory control signal light Ca to Cc is input to the wavelength conversion device 2 on the sending side from the ROADMs 4a to 4c via the transmission lines 90a to 90c, respectively. The wavelength conversion device 2 converts the wavelength bands of the wavelength division multiplexing signal light Sa and Sc such that the wavelength bands in which the plurality of rays of the main signal light is wavelength-multiplexed are different. The wavelength conversion device 2 converts, for example, the wavelength bands of the wavelength division multiplexing signal light Sa and Sc into the L-band and the S-band, respectively, from the C-band. Note that the wavelength band of the wavelength division multiplexing signal light Sb remains in the C-band. The wavelength conversion device 2 combines the wavelength division multiplexing signal light Sa to Sc.

In addition, the wavelength conversion device 2 converts each ray of the supervisory control signal light Ca to Cc into electrical data signals and conducts time division multiplexing on the converted supervisory control signal light Ca to Cc into one multiplex data signal. By converting the multiplex data signal into supervisory control frame signal light Co to combine the supervisory control frame signal light Co with the wavelength division multiplexing signal light Sa to Sc, the wavelength conversion device 2 generates transmission signal light. Note that the supervisory control frame signal light Co contains not only the multiplex data signal but also various kinds of information sent and received between the wavelength conversion devices 1 and 2 as will be described later.

The wavelength conversion device 2 is connected to the wavelength conversion device 1 on the receiving side via the transmission line 91. The transmission signal light in which the supervisory control frame signal light Co and the wavelength division multiplexing signal light Sa to Sc are combined is input to the wavelength conversion device 1 from the transmission line 91.

The wavelength conversion device 1 on the receiving side demultiplexes each ray of the wavelength division multiplexing signal light Sa to Sc from the transmission signal light. The wavelength conversion device 1 converts the wavelength bands of the wavelength division multiplexing signal light Sa and Sc into the original wavelength bands such that the wavelength bands in which the plurality of rays of the main signal lights is wavelength-multiplexed are the same. The wavelength conversion device 1 converts, for example, the wavelength band of the wavelength division multiplexing signal light Sa from the L-band to the C-band and converts the wavelength band of the wavelength division multiplexing signal light Sc from the S-band to the C-band. Note that the wavelength band of the wavelength division multiplexing signal light Sb remains in the C-band.

In addition, the wavelength conversion device 1 demultiplexes the supervisory control frame signal light Co containing the supervisory control signal light Ca to Cc from the transmission signal light and converts the demultiplexed supervisory control frame signal light Co into an electrical supervisory control frame signal. The wavelength conversion device 1 separates each of data signals Ea to Ec before time division multiplexing from the supervisory control frame signal and converts the separated data signals Ea to Ec into the original supervisory control signal light Ca to Cc, respectively.

The wavelength conversion device 1 combines the wavelength division multiplexing signal light Sa and the supervisory control signal light Ca, combines the wavelength division multiplexing signal light Sb and the supervisory control signal light Cb, and combines the wavelength division multiplexing signal light Sc and the supervisory control signal light Cc. The wavelength conversion device 1 is connected to the ROADMs 3a to 3c on the receiving side via transmission lines 92a to 92c, respectively.

The wavelength conversion device 1 outputs the combined light of the wavelength division multiplexing signal light Sa and the supervisory control signal light Ca to the ROADM 3a on the receiving side, outputs the combined light of the wavelength division multiplexing signal light Sb and the supervisory control signal light Cb to the ROADM 3b on the receiving side, and outputs the combined light of the wavelength division multiplexing signal light Sc and the supervisory control signal light Cc to the ROADM 3c on the receiving side. The combined light of the wavelength division multiplexing signal light Sa and the supervisory control signal light Ca is input to the ROADM 3a from the transmission line 92a. The combined light of the wavelength division multiplexing signal light Sb and the supervisory control signal light Cb is input to the ROADM 3b from the transmission line 92b. The combined light of the wavelength division multiplexing signal light Sc and the supervisory control signal light Cc is input to the ROADM 3c from the transmission line 92c.

The ROADM 3a demultiplexes each of the wavelength division multiplexing signal light Sa and the supervisory control signal light Ca and demultiplexes a plurality of rays of the main signal light from the wavelength division multiplexing signal light Sa. The ROADM 3b demultiplexes each of the wavelength division multiplexing signal light Sb and the supervisory control signal light Cb and demultiplexes a plurality of rays of the main signal light from the wavelength division multiplexing signal light Sb. The ROADM 3c demultiplexes each of the wavelength division multiplexing signal light Sc and the supervisory control signal light Cc and demultiplexes a plurality of rays of the main signal light from the wavelength division multiplexing signal light Sc.

In this manner, the ROADMs 4a to 4c on the sending side send the wavelength division multiplexing signal light Sa to Sc and the supervisory control signal light Ca to Cc to the ROADMs 3a to 3c on the receiving side, respectively. The ROADMs 4a to 4c on the sending side are examples of sending devices that send the combined light of the wavelength division multiplexing signal light Sa to Sc and the supervisory control signal light Ca to Cc to the wavelength conversion device 2 on the sending side. In addition, the ROADMs 3a to 3c on the receiving side are examples of receiving devices that receive the wavelength division multiplexing signal light Sa to Sc. The configurations of the ROADMs 4a to 4c on the sending side and the ROADMs 3a to 3c on the receiving side will be described below.

The ROADM 4a on the sending side includes a wavelength selective switch (WSS) 40, a post amplifier 41, a WDM filter 42, an optical splitter 43, a small form-factor pluggable (SFP) transceiver 44, a photodiode (PD) 45, and an OSC sending unit 46. Note that, since the other ROADMs 4b and 4c have configurations similar to the configuration of the ROADM 4a, the description of the configurations of the ROADMs 4b and 4c will be omitted.

The WSS 40 generates the wavelength division multiplexing signal light Sa by wavelength-multiplexing the plurality of rays of the main signal light having different wavelengths. Each ray of the main signal light is input to the WSS 40 from a transponder (not depicted). The wavelength of the main signal light to be subjected to wavelength division multiplexing is set in the WSS 40 by a control device (not depicted). The wavelength division multiplexing signal light Sa is input to the post amplifier 41 from the WSS 40.

The post amplifier 41 amplifies the wavelength division multiplexing signal light Sa. The post amplifier 41 includes an erbium doped fiber amplifier (EDF) or the like. The post amplifier 41 outputs the amplified wavelength division multiplexing signal light Sa to the WDM filter 42.

The OSC sending unit 46 is a circuit implemented by hardware such as a field programmable gate array (FPGA) or an application specified integrated circuit (ASIC), for example. The OSC sending unit 46 generates the data signal Ea containing various kinds of the supervisory control information regarding the wavelength division multiplexing signal light Sa to output the generated data signal Ea to the SFP transceiver 44.

The SFP transceiver 44 converts the data signal Ea into the supervisory control signal light Ca to output the converted supervisory control signal light Ca to the optical splitter 43.

The optical splitter 43 demultiplexes the supervisory control signal light Ca such that the demultiplexed supervisory control signal light Ca is input to each of the photodiode 45 and the WDM filter 42. The optical splitter 43 functions as a tap for the supervisory control signal light Ca.

The WDM filter 42 combines the wavelength division multiplexing signal light Sa and the supervisory control signal light Ca. The combined light of the wavelength division multiplexing signal light Sa and the supervisory control signal light Ca is input to the transmission line 90a from the WDM filter 42. The combined light is output to the wavelength conversion device 2 from the transmission line 90a. The WDM filter 42 is an example of a fourth combining unit that combines the supervisory control signal light Ca with the wavelength division multiplexing signal light Sa to output the combined supervisory control signal light Ca and wavelength division multiplexing signal light Sa to the wavelength conversion device 2 on the sending side.

The photodiode 45 detects sending power Ps of the supervisory control signal light Ca from the optical splitter 43. The photodiode 45 notifies the OSC sending unit 46 of the sending power Ps. The photodiode 45 is an example of a sending power detection unit that detects the sending power Ps of the supervisory control signal light Ca to be sent to the wavelength conversion device 2 on the sending side.

The OSC sending unit 46 is a circuit implemented by hardware such as an FPGA or an ASIC, for example. The OSC sending unit 46 acquires the supervisory control information regarding the supervisory control of the wavelength division multiplexing signal light Sa and generates the data signal Ea containing the supervisory control information. The OSC sending unit 46 acquires, for example, the supervisory control information indicating the setting of the post amplifier 41 from the post amplifier 41 to insert the acquired supervisory control information into the data signal Ea.

In addition, the OSC sending unit 46 inserts the supervisory control information indicating the sending power Ps detected by the photodiode 45 into the data signal Ea. The OSC sending unit 46 and the SFP transceiver 44 are examples of a second generation unit that generates the supervisory control signal light Ca containing the supervisory control information indicating the sending power Ps detected by the photodiode 45.

Similar to the ROADM 4a, the ROADMs 4b and 4c generate the data signals Eb and Ec containing the supervisory control information regarding the supervisory control of the wavelength division multiplexing signal light Sb and Sc. The ROADMs 4b and 4c detect the sending power Ps of the supervisory control signal light Cb and Cc to be sent to the wavelength conversion device 2. The ROADMs 4b and 4c generate the supervisory control signal light Cb and Cc containing the supervisory control information such as the sending power Ps of the supervisory control signal light Cb and Cc to combine the generated supervisory control signal light Cb and Cc with the wavelength division multiplexing signal light Sb and Sc and sends the combined supervisory control signal light Cb and Cc and wavelength division multiplexing signal light Sb and Sc to the wavelength conversion device 2. Note that the supervisory control signal light Ca to Cc in the ROADMs 4a to 4c are examples of third information signal light.

The ROADM 3a on the receiving side includes a WDM filter 30, a preamplifier 31, a wavelength selective switch (WSS) 32, a photodiode (PD) 33, an OSC receiving unit 34, an optical splitter 35, and an SFP receiver 36. Note that, since the other ROADMs 3b and 3c have configurations similar to the configuration of the ROADM 3a, the description of the configurations of the ROADMs 3b and 3c will be omitted.

The combined light of the wavelength division multiplexing signal light Sa and the supervisory control signal light Ca is input to the WDM filter 30 from the transmission line 92a. The WDM filter 30 demultiplexes the combined light into the wavelength division multiplexing signal light Sa and the supervisory control signal light Ca. The wavelength division multiplexing signal light Sa is input to the preamplifier 31, and the supervisory control signal light Ca is input to the optical splitter 35. The WDM filter 30 is an example of a third demultiplexing unit that demultiplexes each of the wavelength division multiplexing signal light Sa and the supervisory control signal light Ca from the combined light.

The preamplifier 31 amplifies the wavelength division multiplexing signal light Sa to output the amplified wavelength division multiplexing signal light Sa to the WSS 32. The gain of the preamplifier 31 is set by the OSC receiving unit 34. The preamplifier 31 is an example of an optical amplifier that amplifies the wavelength division multiplexing signal light Sa demultiplexed by the WDM filter 30.

The WSS 32 separates the main signal light from the wavelength division multiplexing signal light Sa for each wavelength. The wavelength of the main signal light to be subjected to separation is set in the WSS 32 by a control device (not depicted). Each ray of the main signal light is received by a transponder (not depicted).

The optical splitter 35 demultiplexes the supervisory control signal light Ca such that the demultiplexed supervisory control signal light Ca is input to the photodiode 33 and the SFP receiver 36. The optical splitter 35 functions as a tap for the supervisory control signal light Ca.

The photodiode 33 detects receiving power Pr of the supervisory control signal light Ca input from the optical splitter 35. The photodiode 33 notifies the OSC receiving unit 34 of the receiving power Pr. The photodiode 33 is an example of a receiving power detection unit that detects the receiving power of the supervisory control signal light Ca.

The SFP receiver 36 converts the supervisory control signal light Ca into the electrical data signal Ea to output the converted data signal Ea to the OSC receiving unit 34.

The OSC receiving unit 34 is a circuit implemented by hardware such as an FPGA or an ASIC, for example. The OSC receiving unit 34 acquires the receiving power Pr of the supervisory control signal light Ca from the photodiode 33. In addition, the OSC receiving unit 34 acquires the supervisory control information from the data signal Ea. The supervisory control information contains the sending power Ps of the supervisory control signal light Ca in the ROADM 4a on the sending side.

The OSC receiving unit 34 calculates the difference between the sending power Ps and the receiving power Pr of the supervisory control signal light Ca. This causes the OSC receiving unit 34 to acquire the power loss (span loss) of the wavelength division multiplexing signal light Sa that occurs between the ROADMs 3a and 4a before the transmission of the wavelength division multiplexing signal light Sa is started. The OSC receiving unit 34 is an example of a second setting unit and sets the gain of the preamplifier 31 based on the difference between the sending power Ps and the receiving power Pr.

However, as will be described later, the wavelength conversion device 2 on the sending side once converts the supervisory control signal light Ca to Cc into electrical data signals and then converts the converted data signals into optical signals again to send the converted optical signals to the wavelength conversion device 1 on the receiving side. In addition, the wavelength conversion device 1 on the receiving side also once converts the supervisory control signal light Ca to Cc into electrical data signals and then converts the converted data signals into optical signals again to send the converted optical signals to the ROADMs 3a to 3c on the receiving side.

Therefore, when it is presumed that the wavelength conversion device 1 sends the supervisory control signal light Ca to Cc to the ROADMs 3a to 3c, respectively, without attenuating the power of the supervisory control signal light Ca to Cc, the supervisory control signal light Ca to Cc having power losses smaller than the power losses of the wavelength division multiplexing signal light Sa to Sc will be input to the ROADMs 3a to 3c. In this case, since the wavelength division multiplexing transmission device is not able to set an appropriate gain in the preamplifier, the transmission quality of the wavelength division multiplexing signal light deteriorates.

Figure 2:
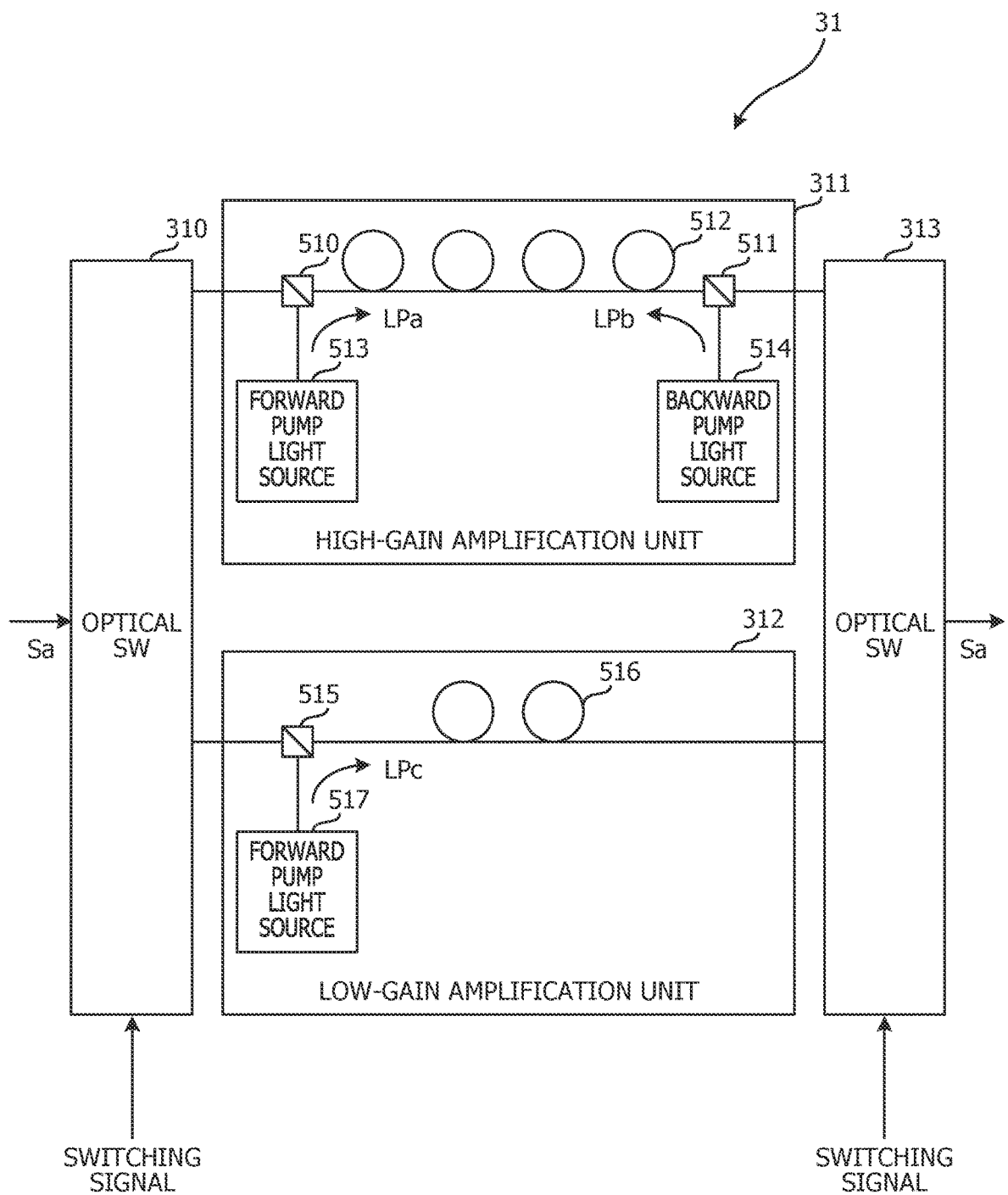
FIG. 2 is a configuration diagram illustrating an example of a preamplifier.

FIG. 2 is a configuration diagram illustrating an example of the preamplifier 31. The preamplifier 31 includes an optical switch (optical SW) 310 on an input side, an optical switch (optical SW) 313 on an output side, a high-gain amplification unit 311, and a low-gain amplification unit 312.

A gain switching signal is input to the optical SWs 310 and 313 from the OSC receiving unit 34. The optical SWs 310 and 313 switch the path of the wavelength division multiplexing signal light Sa between the high-gain amplification unit 311 and the low-gain amplification unit 312 in accordance with the switching signal. The wavelength division multiplexing signal light Sa is amplified by passing through the high-gain amplification unit 311 or the low-gain amplification unit 312 from the optical SW 310 on the input side and then is input to the optical SW 313 on the output side to be output to the WSS 32 in the subsequent stage.

The high-gain amplification unit 311 includes optical couplers 510 and 511, an EDF 512, a forward pump light source 513, and a backward pump light source 514. When the path of the wavelength division multiplexing signal light Sa is switched to the high-gain amplification unit 311, the wavelength division multiplexing signal light Sa is input to the EDF 512. The optical coupler 510 is connected to an input end of the EDF 512. The forward pump light source 513 outputs forward excitation light LPa to the optical coupler 510. The forward excitation light LPa is input to the EDF 512 via the optical coupler 510 and propagates in a direction same as the direction of the wavelength division multiplexing signal light Sa.

The optical coupler 511 is connected to an output end of the EDF 512. The backward pump light source 514 outputs backward excitation light LPb to the optical coupler 511. The backward excitation light LPb is input to the EDF 512 via the optical coupler 511. The forward excitation light LPa and the backward excitation light LPb propagate the EDF 512 in directions opposite to each other to amplify the wavelength division multiplexing signal light Sa.

The low-gain amplification unit 312 is a forward Raman amplifier and includes an optical coupler 515, an EDF 516, and a forward pump light source 517. When the path of the wavelength division multiplexing signal light Sa is switched to the low-gain amplification unit 312, the wavelength division multiplexing signal light Sa is input to the EDF 516. The length of the EDF 516 is shorter than the length of the EDF 512 of the high-gain amplification unit 311.

The optical coupler 515 is connected to an input end of the EDF 516. The forward pump light source 517 outputs forward excitation light LPc to the optical coupler 515. The forward excitation light LPc is input to the EDF 516 via the optical coupler 515. The forward excitation light LPc propagates the EDF 516 in a direction same as the direction of the wavelength division multiplexing signal light Sa to amplify the wavelength division multiplexing signal light Sa.

The gain of the high-gain amplification unit 311 is larger than the gain of the low-gain amplification unit 312. Therefore, the preamplifier 31 is allowed to select the gain according to the switching signal. The OSC receiving unit 34 calculates the power loss (span loss) of the wavelength division multiplexing signal light Sa from the difference between the sending power Ps and the receiving power Pr. At this time, the OSC receiving unit 34 may hold the sending power Ps as a fixed value in a memory or the like and calculate the power loss based on the receiving power Pr.

The OSC receiving unit 34 outputs a switching signal that switches the path of the wavelength division multiplexing signal light Sa to the high-gain amplification unit 311 when the power loss is equal to or higher than a threshold value and outputs a switching signal that switches the path of the wavelength division multiplexing signal light Sa to the low-gain amplification unit 312 when the power loss is lower than the threshold value. In this manner, the OSC receiving unit 34 sets the gain of the preamplifier 31 based on the receiving power Pr.

Note that, in the present example, the gain of the preamplifier 31 has been exemplified with two options but is not limited to this example. The preamplifier 31 may be allowed to select three or more gains. In addition, although the configuration of the preamplifier 31 of the ROADM 3a has been described in the present example, the preamplifiers of the other ROADMs 3b and 3c have configurations similar to the configuration of the preamplifier 31 of the ROADM 3a.

Referring to FIG. 1 again, LOSa to LOSe indicate the power losses (span losses) that occur when the wavelength division multiplexing signal light Sa to Sc is transmitted to the ROADMs 3a to 3c on the receiving side from the ROADMs 4a to 4c on the sending side, respectively. Note that, in the present example, for convenience of explanation, the power losses LOSa to LOSe common to each ray of the wavelength division multiplexing signal light Sa to Sc are defined, but strictly speaking, the power losses LOSa to LOSe are different for each ray of the wavelength division multiplexing signal light Sa to Sc according to various conditions such as the wavelength band and the fiber length.

The power loss LOSa occurs in the transmission lines 90a to 90c between the ROADMs 4a to 4c and the wavelength conversion device 2 on the sending side, and the power loss LOSb occurs within the wavelength conversion device 2. The power loss LOSc occurs in the transmission line 91 between the wavelength conversion device 2 on the sending side and the wavelength conversion device 1 on the receiving side, and the power loss LOSd occurs within the wavelength conversion device 1. The power loss LOSe occurs in the transmission lines 92a to 92c between the ROADMs 3a to 3c and the wavelength conversion device 1 on the receiving side.

Accordingly, the span loss of each ray of the wavelength division multiplexing signal light Sa to Sc is the sum of the power losses LOSa to LOSe. However, since the gain of the preamplifier 31 is set before the transmission system 9 starts the communication service, for example, before the transmission of the wavelength division multiplexing signal light Sa to Sc is started, it is difficult to measure the span loss using the wavelength division multiplexing signal light Sa to Sc.

Therefore, the ROADMs 3a to 3c measure the span losses using the supervisory control signal light Ca to Cc before the transmission of the wavelength division multiplexing signal light Sa to Sc is started. As described above, the ROADMs 3a to 3c acquire the sending power Ps of the supervisory control signal light Ca to Cc from the supervisory control signal light Ca to Cc received from the ROADMs 4a to 4c on the sending side and acquire the receiving power of the supervisory control signal light Ca to Cc received from the wavelength conversion device 1 to set the gain of the preamplifier 31 from the difference between the acquired sending power Ps and the acquired receiving power (Pr−Ps). Note that the ROADMs 3a to 3c may hold the sending power Ps as a fixed value in advance.

However, as described above, when it is presumed that the supervisory control signal light Ca to Cc having a smaller power loss than the power loss of the wavelength division multiplexing signal light Sa to Sc is input to the ROADMs 3a to 3c, an appropriate gain may not be set in the preamplifier 31 and therefore, the transmission quality of the wavelength division multiplexing signal light Sa to Sc deteriorates.

In order to cope with this, by calculating the power loss LOSc of the transmission line 91 from the input power of the supervisory control frame signal light Co and attenuating the supervisory control signal light Ca to Cc to be sent to the ROADMs 3a to 3c based on the power loss LOSc, the wavelength conversion device 1 on the receiving side implements a power loss close to the power loss of the wavelength division multiplexing signal light Sa to Sc. In addition, the wavelength conversion device 2 on the sending side sends various parameters used for calculating the attenuation amount to the wavelength conversion device 1 on the receiving side in order to make the power loss of the wavelength division multiplexing signal light Sa to Sc more accurate. This allows the ROADMs 3a to 3c to measure the power losses of the wavelength division multiplexing signal light Sa to Sc with the supervisory control signal light Ca to Cc. The details of each of the wavelength conversion devices 1 and 2 will be described below.

(Configuration of Wavelength Conversion Device on Sending Side)

Figure 3A:
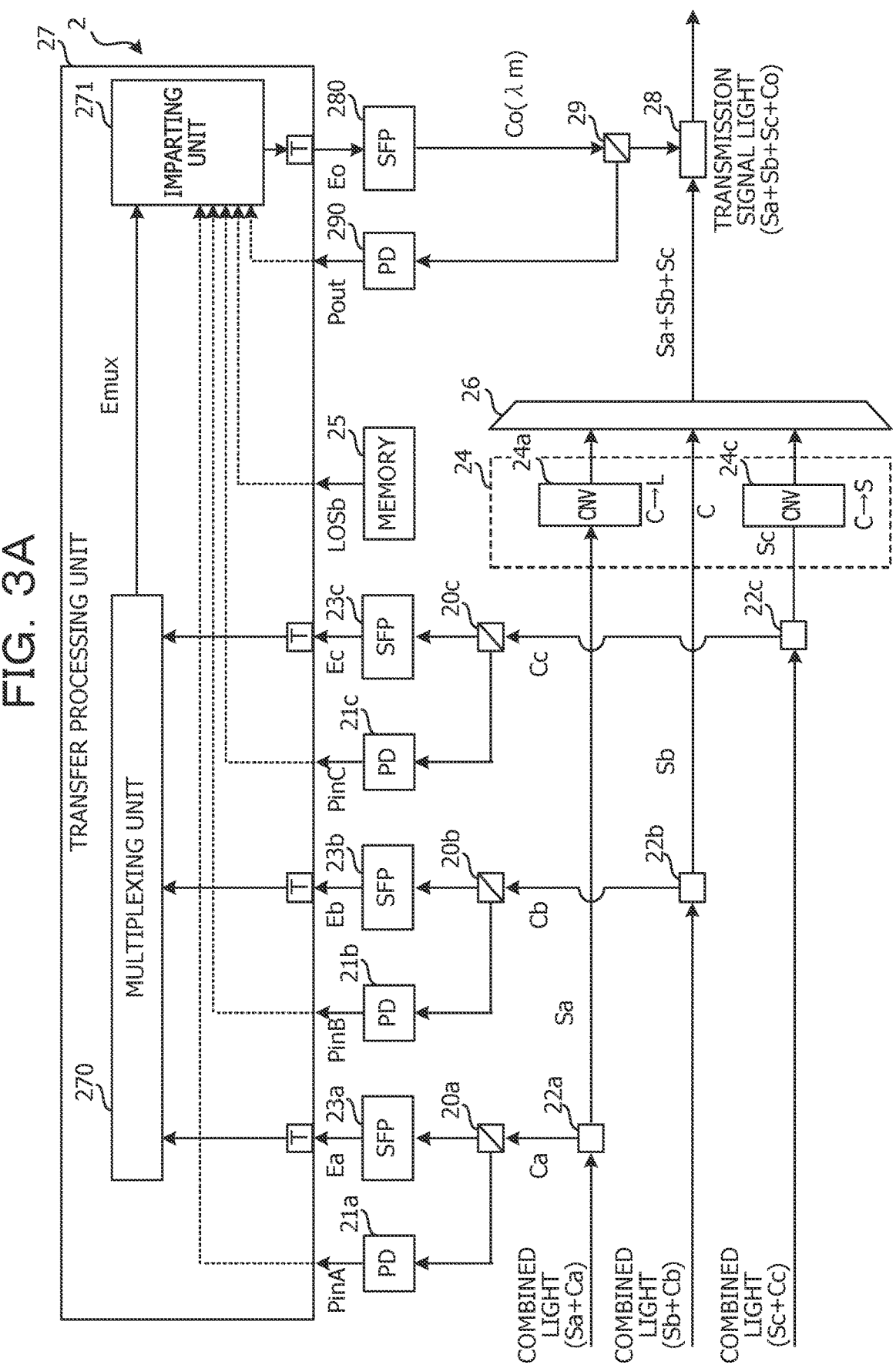
FIG. 3A is a configuration diagram illustrating an example of a wavelength conversion device on a sending side.

FIG. 3A is a configuration diagram illustrating an example of the wavelength conversion device 2 on the sending side. The wavelength conversion device 2 includes optical splitters 20a to 20c and 29, photodiodes (PD) 21a to 21c and 290, WDM filters 22a to 22c, SFP receivers 23a to 23c, an SFP transceiver 280, a wavelength conversion unit 24, a memory 25, a combiner 26, a transfer processing unit 27, and a WDM filter 28. Note that the wavelength conversion device 2 on the sending side is an example of an output source device that outputs transmission signal light to the transmission line 91.

The WDM filters 22a to 22c are optically connected to the ROADMs 4a to 4c on the sending side via the transmission lines 90a to 90c, respectively. The combined light of the wavelength division multiplexing signal light Sa and the supervisory control signal light Ca is input to the WDM filter 22a from the transmission line 90a. The WDM filter 22a demultiplexes the wavelength division multiplexing signal light Sa and the supervisory control signal light Ca. The wavelength division multiplexing signal light Sa is input to the wavelength conversion unit 24, and the supervisory control signal light Ca is input to the optical splitter 20a.

The combined light of the wavelength division multiplexing signal light Sb and the supervisory control signal light Cb is input to the WDM filter 22b from the transmission line 90b. The WDM filter 22b demultiplexes the wavelength division multiplexing signal light Sb and the supervisory control signal light Cb. The wavelength division multiplexing signal light Sb is input to the wavelength conversion unit 24, and the supervisory control signal light Cb is input to the optical splitter 20b.

The combined light of the wavelength division multiplexing signal light Sc and the supervisory control signal light Cc is input to the WDM filter 22c from the transmission line 90c. The WDM filter 22c demultiplexes the wavelength division multiplexing signal light Sc and the supervisory control signal light Cc. The wavelength division multiplexing signal light Sc is input to the wavelength conversion unit 24, and the supervisory control signal light Cc is input to the optical splitter 20c.

The optical splitter 20a demultiplexes the supervisory control signal light Ca. The demultiplexed supervisory control signal light Ca is input to the photodiode 21a and the SFP receiver 23a. The photodiode 21a detects input power PinA of the supervisory control signal light Ca input from the optical splitter 20a.

The optical splitter 20b demultiplexes the supervisory control signal light Cb. The demultiplexed supervisory control signal light Cb is input to the photodiode 21b and the SFP receiver 23b. The photodiode 21b detects input power PinB of the supervisory control signal light Cb input from the optical splitter 20b.

The optical splitter 20c demultiplexes the supervisory control signal light Cc. The demultiplexed supervisory control signal light Cc is input to the photodiode 21c and the SFP receiver 23c. The photodiode 21c detects input power PinC of the supervisory control signal light Cc input from the optical splitter 20c.

The photodiodes 21a to 21c are examples of a third power detection unit that detects the input power PinA to PinC of the supervisory control signal light Ca to Cc input from the ROADM 3a on the sending side, respectively. The photodiodes 21a to 21c notify the transfer processing unit 27 of the input power PinA to PinC.

The SFP receiver 23a converts the supervisory control signal light Ca into the electrical data signal Ea to output the converted data signal Ea to the transfer processing unit 27. The SFP receiver 23b converts the supervisory control signal light Cb into the electrical data signal Eb to output the converted data signal Eb to the transfer processing unit 27. The SFP receiver 23c converts the supervisory control signal light Cc into the electrical data signal Ec to output the converted data signal Ec to the transfer processing unit 27. The data signals Ea to Ec are examples of first and second information signals.

The wavelength conversion unit 24 is an example of a second wavelength conversion unit that converts the wavelength bands of the wavelength division multiplexing signal light Sa and Sc such that the wavelength bands of the wavelength division multiplexing signal light Sa to Sc are different and includes the wavelength converters 24a and 24c. The wavelength converter 24a converts the wavelength band of the wavelength division multiplexing signal light Sa from the C-band to the L-band, and the wavelength converter 24c converts the wavelength band of the wavelength division multiplexing signal light Sc from the C-band to the S-band.

The wavelength conversion unit 24 outputs the wavelength division multiplexing signal light Sb as it is in the C-band without converting the wavelength band of the wavelength division multiplexing signal light Sb. The wavelength conversion unit 24 is not limited to this and for example, may convert the wavelength bands of the wavelength division multiplexing signal light Sa and Sb to keep the wavelength band of the wavelength division multiplexing signal light Sc unconverted. The wavelength division multiplexing signal light Sa to Sc is input to the combiner 26 from the wavelength conversion unit 24.

The combiner 26 is, for example, an optical coupler and combines the wavelength division multiplexing signal light Sa to Sc. The combined light of the wavelength division multiplexing signal light Sa to Sc is input to the WDM filter 28 from the combiner 26.

The transfer processing unit 27 has the function of, for example, a layer 2 switch and includes a plurality of ports T where signals are input and output, a multiplexing unit 270, and an imparting unit 271. The transfer processing unit 27 is a circuit implemented by hardware such as an FPGA or an ASIC, for example.

The data signals Ea to Ec are input to the multiplexing unit 270 through the different ports T of the transfer processing unit 27 from the SFP receivers 23a to 23b. In addition, the photodiodes 21a to 21c output input power information indicating the input power PinA to PinC of the detection results to the imparting unit 271.

The multiplexing unit 270 conducts time division multiplexing on the data signals Ea to Ec to generate a multiplex data signal Emux and outputs the generated multiplex data signal Emux to the imparting unit 271. The transfer processing unit 27 is an example of a first generation unit that generates the multiplex data signal Emux by multiplexing the data signals Ea to Ec. In addition, the multiplex data signal Emux is an example of a multiplex signal.

The imparting unit 271 imparts the input power information to the multiplex data signal Emux. In addition, the imparting unit 271 reads power loss information from the memory 25 to impart the read power loss information to the multiplex data signal Emux. The power loss information indicates the power loss LOSb of the wavelength division multiplexing signal light Sa to Sc within the wavelength conversion device 2. The power loss LOSb occurs due to wavelength conversion and the like when the wavelength division multiplexing signal light Sa to Sc passes through the wavelength conversion device 2.

Furthermore, the imparting unit 271 imparts output power information input from the photodiode 290 to the multiplex data signal Emux. The output power information indicates output power Pout of the supervisory control frame signal light Co output to the transmission line 91.

In this manner, the imparting unit 271 imparts the input power information, the power loss information, and the output power information to the multiplex data signal Emux. The multiplex data signal Emux to which each piece of the information has been imparted is input to the SFP transceiver 280 as a supervisory control frame signal Eo via the port T.

The SFP transceiver 280 converts the supervisory control frame signal Eo into the supervisory control frame signal light Co to output the converted supervisory control frame signal light Co to the optical splitter 29. The SFP transceiver 280 sets a center wavelength (hereinafter, simply referred to as a wavelength) λm of the supervisory control frame signal light Co in the outside of each wavelength band of the C-band, the L-band, and the S-band. Therefore, decreases in the bandwidths of the wavelength division multiplexing signal light Sa to Sc due to the supervisory control signal light Ca to Cc are suppressed. Note that the SFP transceiver 280 is an example of a multiplex signal conversion unit that converts the multiplex data signal Emux into the supervisory control frame signal light Co.

The optical splitter 29 demultiplexes the supervisory control frame signal light Co. The supervisory control frame signal light Co is input to each of the photodiode 290 and the WDM filter 28 from the optical splitter 29.

The combined light of the wavelength division multiplexing signal light Sa to Sc is input to the WDM filter 28 from the combiner 26, and the supervisory control frame signal light Co is input to the WDM filter 28 from the SFP transceiver 280. The WDM filter 28 combines the combined light of the wavelength division multiplexing signal light Sa to Sc and the supervisory control frame signal light Co. This generates the transmission signal light. The WDM filter 28 is an example of a third combining unit that combines the supervisory control signal light Ca to Cc with the wavelength division multiplexing signal light Sa to Sc to output the combined supervisory control signal light Ca to Cc and wavelength division multiplexing signal light Sa to Sc to the transmission line 91.

The photodiode 290 detects the output power Pout of the supervisory control frame signal light Co. The photodiode 290 notifies the imparting unit 271 of the output power Pout. As described above, the imparting unit 271 imparts the output power information indicating the output power Pout detected by the photodiode 290 to the multiplex data signal Emux.

Figure 3B:
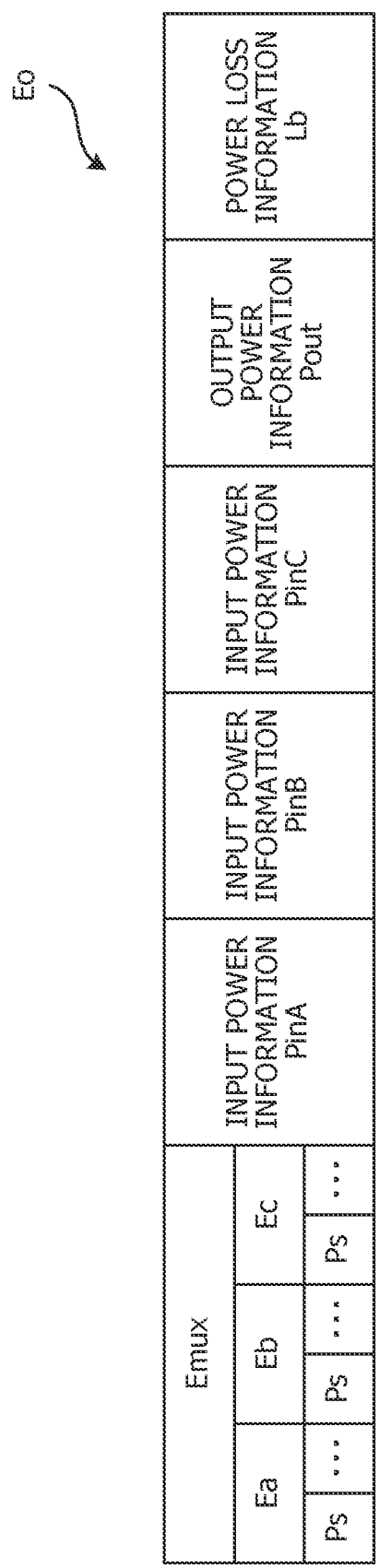
FIG. 3B is a diagram illustrating an example of a supervisory control frame signal output from a transfer processing unit.

FIG. 3B is a diagram illustrating an example of the supervisory control frame signal Eo output from the transfer processing unit 27. The supervisory control frame signal Eo contains the multiplex data signal Emux obtained by conducting time division multiplexing on the data signals Ea to Ec from the ROADMs 4a to 4c on the sending side, the input power information, the power loss information, and the output power information. The data signals Ea to Ec contain supervisory control information on the sending power Ps of the supervisory control signal light Ca to Cc in the ROADMs 4a to 4c on the sending side, respectively.

The wavelength conversion device 1 on the receiving side is not capable of identifying the data signals Ea to Ec from the supervisory control frame signal Eo, but the ROADMs 4a to 4c on the receiving side is capable of identifying the data signals Ea to Ec and acquiring the sending power Ps of each ray of the supervisory control signal light Ca to Cc. In addition, the wavelength conversion device 1 on the receiving side is capable of identifying the input power information, the power loss information, and the output power information from the supervisory control frame signal Eo and acquiring the input power PinA to PinC, the output power Pout, and the power loss LOSb.

The wavelength conversion device 1 on the receiving side is capable of calculating the power losses LOSa to LOSe of the wavelength division multiplexing signal light Sa to Sc between the ROADMs 4a to 4c on the sending side and the ROADMs 3a to 3c on the receiving side, based on the input power PinA to PinC, the output power Pout, and the power loss LOSb.

Next, the configuration of the wavelength converters 24a and 24c will be described.

Figure 4:
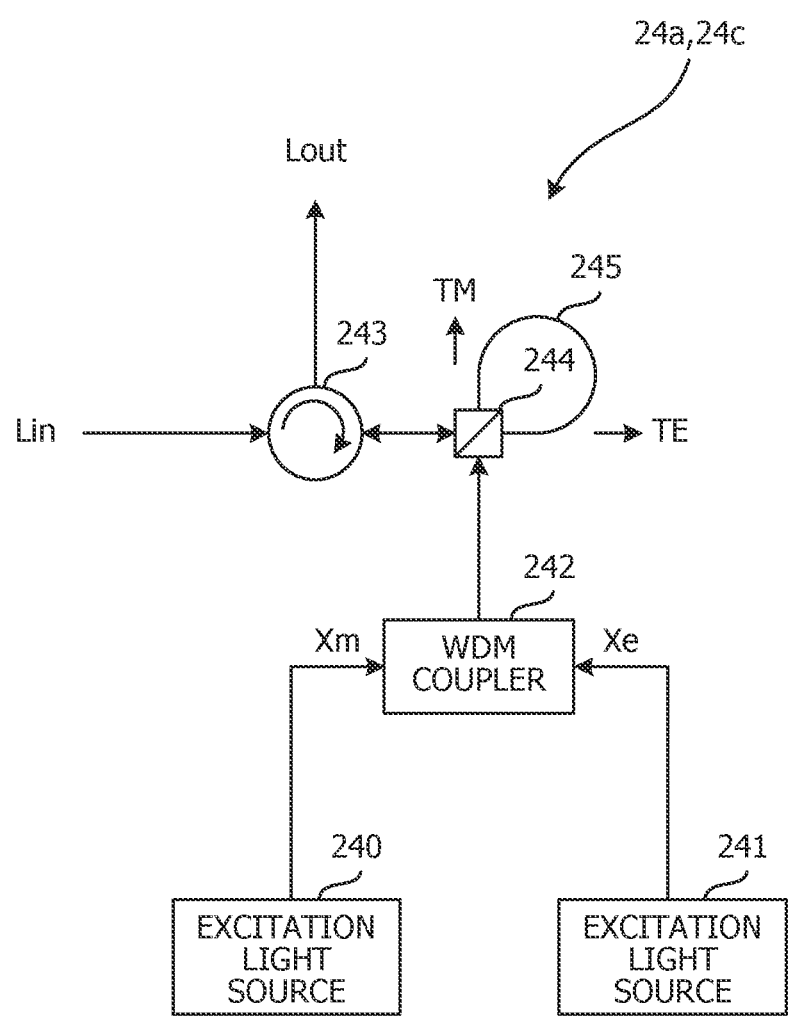
FIG. 4 is a configuration diagram illustrating an example of wavelength converters.

FIG. 4 is a configuration diagram illustrating an example of the wavelength converters 24a and 24c. The wavelength converters 24a and 24c each include a WDM coupler 242, excitation light sources 240 and 241, an optical circulator 243, a polarization beam splitter 244, and a highly non-linear fiber (HNLF) 245.

Here, the wavelength division multiplexing signal light Sa and Sc to be input to the wavelength converters 24a and 24c will be referred to as input light Lin. In addition, the wavelength division multiplexing signal light Sa and Sc to be output from the wavelength converters 24a and 24c will be referred to as output light Lout.

The excitation light sources 240 and 241 output excitation light Xm and Xe, respectively, to the WDM coupler 242. The respective polarizations of the excitation light Xm and Xe are orthogonal to each other. The WDM coupler 242 wavelength-multiplexes the two rays of the excitation light Xm and Xe to output the wavelength-multiplexed excitation light Xm and Xe to the polarization beam splitter 244. In addition, the input light Lin is input to the polarization beam splitter 244 through the optical circulator 243.

Two ends of the highly non-linear fiber 245 are connected to the polarization beam splitter 244. The highly non-linear fiber 245 has two principal axes. A transverse electric (TE) polarization output port of the polarization beam splitter 244 is connected to one end of the highly non-linear fiber 245 at an angle in line with one principal axis. A transverse magnetic (TM) polarization output port of the polarization beam splitter 244 is connected to the other end of the highly non-linear fiber 245 at an angle in line with the same principal axis.

The excitation light Xm and Xe and the input light Lin are separated into TE polarization and TM polarization by the polarization beam splitter 244, and the TE polarization and the TM polarization are input to different ends of the highly non-linear fiber 245 and input to the polarization beam splitter 244 again from the other ends.

The highly non-linear fiber 245 generates four-wave mixing (FWM) of the excitation light Xm and Xe and the input light Lin. The idler light generated by the four-wave mixing has a wavelength according to the difference between the respective wavelengths of the excitation light Xm and Xe and the input light Lin. The idler light is input to the optical circulator 243 from the highly non-linear fiber 245 through the polarization beam splitter 244. The idler light is output from the optical circulator 243 as the output light Lout.

This converts the wavelength bands of the wavelength division multiplexing signal light Sa and Sc between the C-band and the L-band or the S-band. Note that the wavelength converters 24a and 24c use two rays of the excitation light Xm and Xe but may use a single ray of the excitation light.

In this manner, the wavelength conversion device 2 on the sending side converts the wavelength band of each ray of the wavelength division multiplexing signal light Sa to Sc such that the wavelength bands are different and combines each ray of the wavelength division multiplexing signal light Sa to Sc to output the combined wavelength division multiplexing signal light Sa to Sc to the transmission line 91. Therefore, the utilization efficiency of the transmission band of the transmission line 91 is improved as compared with the case where each ray of the wavelength division multiplexing signal light Sa to Sc is output to different transmission lines without being combined.

Figure 5:
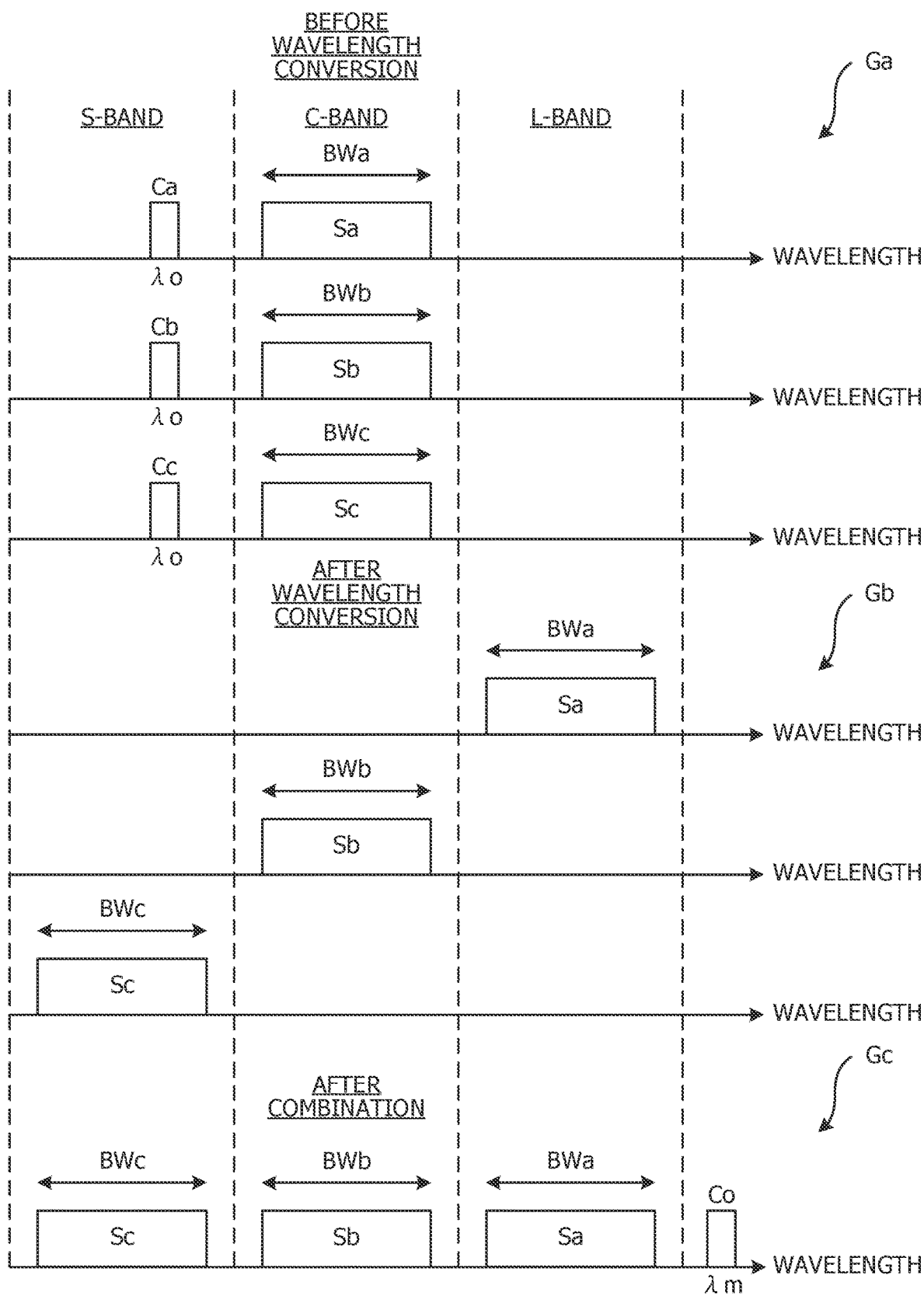
FIG. 5 is a diagram illustrating an example of wavelength bands of wavelength division multiplexing signal light and supervisory control signal light before and after wavelength conversion and after combination in the wavelength conversion device.

FIG. 5 is a diagram illustrating an example of the wavelength bands of the wavelength division multiplexing signal light Sa to Sc and supervisory control signal light Ca to Cc before and after wavelength conversion and after combination in the wavelength conversion device 2.

The reference sign Ga indicates the wavelength bands before wavelength conversion. A wavelength $\lambda o$ of each ray of the supervisory control signal light Ca to Cc is common and is set to, for example, 1510 (nm) so as to correspond to a usual transmission scheme for the C-band range. Since the wavelength $\lambda o$ is arranged in wavelength bands different from the wavelength bands of the wavelength division multiplexing signal light Sa to Sc, bandwidths BWa to BWc of the wavelength division multiplexing signal light Sa to Sc are wider than the case where the wavelength $\lambda o$ is set to the same wavelength bands as the wavelength bands of the wavelength division multiplexing signal light Sa to Sc.

The reference sign Gb indicates the wavelength bands after wavelength conversion. The wavelength bands of the wavelength division multiplexing signal light Sa and Sc are converted into the L-band and the S-band, respectively, from the C-band. The wavelength bands of the wavelength division multiplexing signal light Sa to Sc after wavelength conversion are not limited as long as the wavelength bands do not overlap with each other.

The reference sign Gc indicates the wavelength bands after combination. The supervisory control signal light Ca to Cc has been combined with the wavelength division multiplexing signal light Sa to Sc, respectively, as the supervisory control frame signal light Co having a single wavelength $\lambda m$. Therefore, decreases in the bandwidths BWa to BWc of the wavelength division multiplexing signal light Sa to Sc due to the supervisory control signal light Ca to Cc are suppressed.

(Configuration of Wavelength Conversion Device on Receiving Side)

The wavelength conversion device 1 on the receiving side demultiplexes the wavelength division multiplexing signal light Sa to Sc and the supervisory control signal light Ca to Cc for each of the ROADMs 3a to 3c from the transmission signal light input from the wavelength conversion device 2 on the sending side via the transmission line 91.

Figure 6:
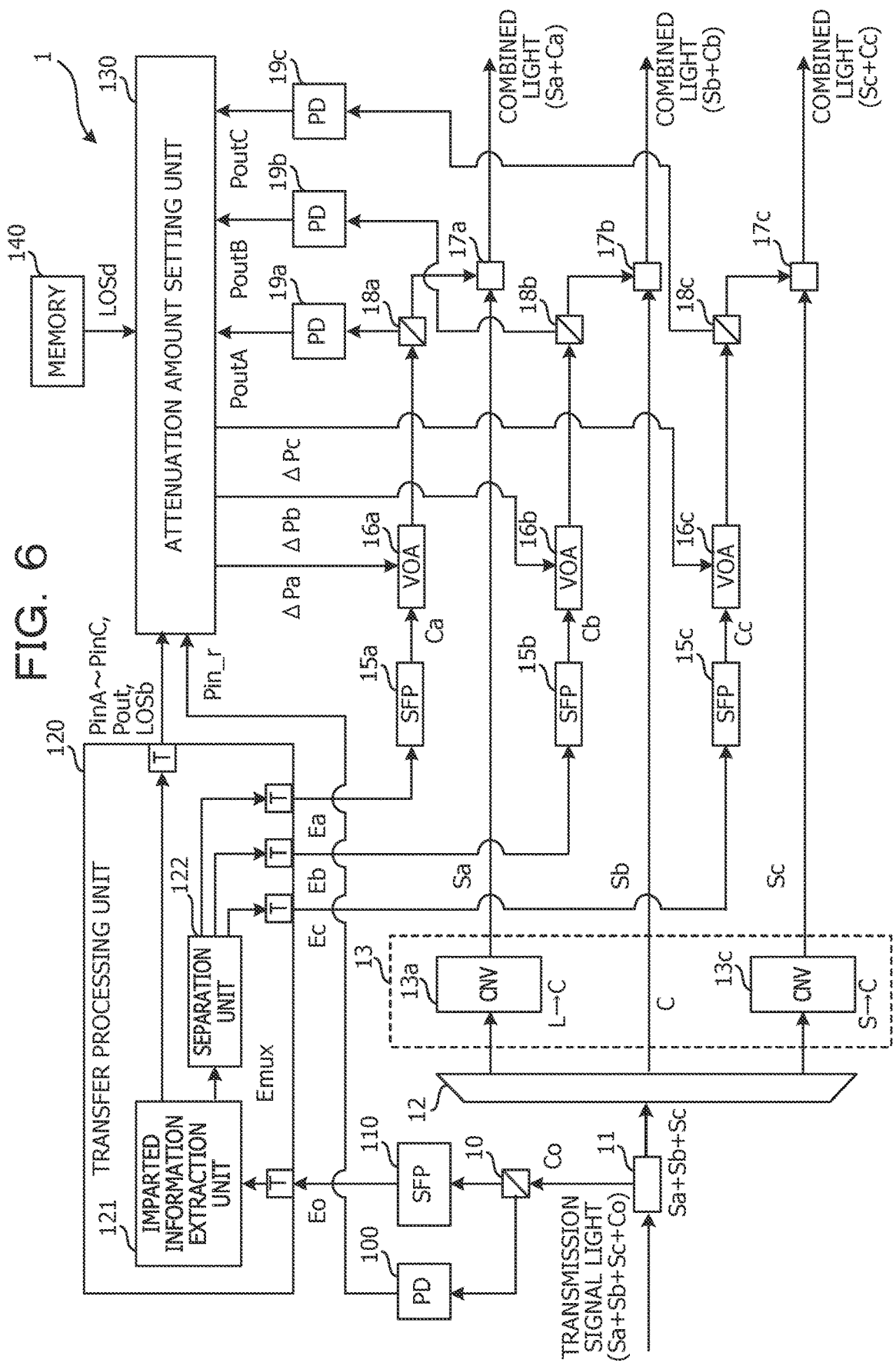
FIG. 6 is a configuration diagram illustrating an example of a wavelength conversion device on a receiving side.

FIG. 6 is a configuration diagram illustrating an example of the wavelength conversion device 1 on the receiving side. The wavelength conversion device 1 includes optical splitters 10 and 18a to 18c, WDM filters 11 and 17a to 17c, a demultiplexer 12, a wavelength conversion unit 13, SFP transceivers 15a to 15c, variable optical attenuators (VOAs) 16a to 16c, photodiodes 19a to 19c and 100, an SFP receiver 110, a transfer processing unit 120, and an attenuation amount setting unit 130.

The WDM filter 11 is optically connected to the wavelength conversion device 2 on the sending side via the transmission line 91. The transmission signal light is input to the WDM filter 11 from the transmission line 91. The WDM filter 11 is an example of a first demultiplexing unit and demultiplexes the transmission signal light into the combined light of the wavelength division multiplexing signal light Sa to Sc and the supervisory control frame signal light Co. The supervisory control frame signal light Co is an example of supervisory control signal light relating to supervisory control of the wavelength division multiplexing signal light Sa to Sc.

The combined light of the wavelength division multiplexing signal light Sa to Sc is input to the demultiplexer 12, and the supervisory control frame signal light Co is input to the optical splitter 10. Note that the WDM filter 11 is an example of the first demultiplexing unit that demultiplexes the supervisory control frame signal light Co from the transmission signal light input from the transmission line 91.

The optical splitter 10 demultiplexes the supervisory control frame signal light Co. The supervisory control frame signal light Co is input to the photodiode 100 and the SFP receiver 110 from the optical splitter 10.

The photodiode 100 is an example of a first power detection unit and detects input power Pin_r of the supervisory control frame signal light Co. The photodiode 100 notifies the attenuation amount setting unit 130 of the input power Pin_r.

The SFP receiver 110 converts the supervisory control frame signal light Co into the electrical supervisory control frame signal Eo to output the converted supervisory control frame signal Eo to the transfer processing unit 120. The SFP receiver 110 is an example of a photoelectric conversion unit that converts the supervisory control frame signal light Co into an electrical signal. Note that the supervisory control frame signal Eo is an example of the electrical signal.

The demultiplexer 12 demultiplexes each ray of the wavelength division multiplexing signal light Sa to Sc combined in the transmission signal light. The demultiplexer 12 is an example of a second demultiplexing unit that demultiplexes each ray of the wavelength division multiplexing signal light Sa to Sc from the transmission signal light. The demultiplexer 12 is, for example, a WDM filter and demultiplexes the wavelength division multiplexing signal light Sa to Sc for each wavelength band. The wavelength division multiplexing signal light Sa to Sc is input to the wavelength conversion unit 13 from the demultiplexer 12.

The wavelength conversion unit 13 is an example of a first wavelength conversion unit that converts the wavelength bands of the wavelength division multiplexing signal light Sa to Sc. The wavelength conversion unit 13 converts the wavelength bands of the wavelength division multiplexing signal light Sa to Sc into the same wavelength band. The wavelength conversion unit 13 includes wavelength converters 13a and 13c having configurations similar to the configurations of the wavelength converters 24a and 24c on the sending side.

The wavelength converter 13a converts the wavelength band of the wavelength division multiplexing signal light Sa into the C-band from the L-band. In addition, the wavelength converter 13c converts the wavelength band of the wavelength division multiplexing signal light Sc into the C-band from the S-band. Therefore, the wavelength bands of the wavelength division multiplexing signal light Sa to Sc return to the wavelength bands before the conversion by the wavelength conversion device 2 on the sending side.

The wavelength conversion unit 13 outputs the wavelength band of the wavelength division multiplexing signal light Sb as it is in the C-band without converting the wavelength band such that the wavelength band of each ray of the wavelength division multiplexing signal light Sa to Sc becomes the same wavelength band of the C-band. The wavelength conversion unit 13 is not limited to this and for example, may convert the wavelength bands of the wavelength division multiplexing signal light Sa and Sb to keep the wavelength band of the wavelength division multiplexing signal light Sc unconverted. The wavelength division multiplexing signal light Sa to Sc is input to the WDM filters 17a to 17c, respectively, from the wavelength conversion unit 13.

The transfer processing unit 120 has the function of, for example, a layer 2 switch and includes a plurality of ports T where signals are input and output, an imparted information extraction unit 121, and a separation unit 122. The transfer processing unit 120 is a circuit implemented by hardware such as an FPGA or an ASIC, for example.

The supervisory control frame signal Eo is input to the imparted information extraction unit 121 from the SFP receiver 110 via the port T. The imparted information extraction unit 121 extracts the input power information (PinA to PinC), the output power information (Pout), and the power loss information (LOSb) from the supervisory control frame signal Eo. At this time, for example, the imparted information extraction unit 121 acquires each piece of the information by detecting the respective positions of the input power information, the output power information, and the power loss information from the configuration of the supervisory control frame signal Eo illustrated in FIG. 3B.

The imparted information extraction unit 121 outputs a setting information signal containing the input power information, the output power information, and the power loss information to the attenuation amount setting unit 130 via the port T. The attenuation amount setting unit 130 uses the input power information, the output power information, and the power loss information to calculate the attenuation amount for the VOAs 16a to 16c. In addition, the imparted information extraction unit 121 outputs the multiplex data signal Emux to the separation unit 122 after acquiring the input power information, the output power information, and the power loss information.

The separation unit 122 separates the multiplex data signal Emux into the data signals Ea to Ec. At this time, for example, the separation unit 122 detects the positions of the data signals Ea to Ec by establishing synchronization with the supervisory control frame signal Eo and acquires the data signals Ea to Ec. The separation unit 122 outputs the data signals Ea to Ec to the SFP transceivers 15a to 15c, respectively, via the ports T. Note that the transfer processing unit 120 is an example of an acquisition unit that acquires the data signals Ea to Ec containing the supervisory control information of the wavelength division multiplexing signal light Sa to Sc, respectively, from the supervisory control frame signal Eo.

The SFP transceivers 15a to 15c convert the data signals Ea to Ec into the supervisory control signal light Ca to Cc, respectively. The SFP transceivers 15a to 15c are examples of first and second signal conversion units. In addition, the supervisory control signal light Ca to Cc is examples of first and second information signal light.

The VOAs 16a to 16c are optically connected in the subsequent stages of the SFP transceivers 15a to 15c, respectively. The supervisory control signal light Ca to Cc is input to the VOAs 16a to 16c from the SFP transceivers 15a to 15c, respectively.

The VOAs 16a to 16c attenuate the supervisory control signal light Ca to Cc by attenuation amounts $\Delta Pa$ to $\Delta Pc$ set by the attenuation amount setting unit 130, respectively. The VOAs 16a to 16c are examples of first and second variable optical attenuators.

The optical splitters 18a to 18c are connected in the subsequent stages of the VOAs 16a to 16c, respectively. The supervisory control signal light Ca to Cc is input to the optical splitters 18a to 18c from the VOAs 16a to 16c, respectively.

The optical splitter 18a demultiplexes the supervisory control signal light Ca. The supervisory control signal light Ca is input to the photodiode 19a and the WDM filter 17a from the optical splitter 18a. The WDM filter 17a combines the wavelength division multiplexing signal light Sa input from the wavelength conversion unit 13 and the supervisory control signal light Ca. The combined light of the wavelength division multiplexing signal light Sa and the supervisory control signal light Ca is output to the ROADM 3a on the receiving side via the transmission line 92a.

The optical splitter 18b demultiplexes the supervisory control signal light Cb. The supervisory control signal light Cb is input to the photodiode 19b and the WDM filter 17b from the optical splitter 18b. The WDM filter 17b combines the wavelength division multiplexing signal light Sb input from the wavelength conversion unit 13 and the supervisory control signal light Cb. The combined light of the wavelength division multiplexing signal light Sb and the supervisory control signal light Cb is output to the ROADM 3b on the receiving side via the transmission line 92b.

The optical splitter 18c demultiplexes the supervisory control signal light Cc. The supervisory control signal light Cc is input to the photodiode 19c and the WDM filter 17c from the optical splitter 18c. The WDM filter 17c combines the wavelength division multiplexing signal light Sc input from the wavelength conversion unit 13 and the supervisory control signal light Cc. The combined light of the wavelength division multiplexing signal light Sc and the supervisory control signal light Cc is output to the ROADM 3c on the receiving side via the transmission line 92c. Note that the WDM filters 17a to 17c are examples of first and second combining units that combine the supervisory control signal light Ca to Cc attenuated by the VOAs 16a to 16c and the wavelength division multiplexing signal light Sa to Sc and output the combined supervisory control signal light Ca to Cc and wavelength division multiplexing signal light Sa to Sc to the ROADMs 3a to 3c.

The photodiodes 19a to 19c are examples of a second power detection unit and detect output power PoutA to PoutC of the supervisory control signal light Ca to Cc attenuated by the VOAs 16a to 16c. For example, the photodiodes 19a to 19c detect the output power PoutA to PoutC of the supervisory control signal light Ca to Cc to be output to the ROADMs 3a to 3c on the receiving side. The photodiodes 19a to 19c notify the attenuation amount setting unit 130 of the output power PoutA to PoutC.

The attenuation amount setting unit 130 is an example of a first setting unit and calculates the power loss LOSc of the supervisory control frame signal light Co within the transmission line 91 from the input power Pin_r of the supervisory control frame signal light Co to set the attenuation amounts ΔPa to ΔPc based on the power loss LOSc in the variable optical attenuators 16a to 16c. The VOAs 16a to 16c attenuate the supervisory control signal light Ca to Cc to be output to the ROADMs 3a to 3c on the receiving side, respectively, from the wavelength conversion device 1.

Therefore, the VOAs 16a to 16c may reflect the power loss LOSc within the transmission line 91 in the output power PoutA to PoutC of the supervisory control signal light Ca to Cc, respectively. Accordingly, the ROADMs 3a to 3c may measure the power loss LOSc within the transmission line 91 as a span loss.

At this time, the attenuation amount setting unit 130 calculates the power loss LOSc within the transmission line 91 from the difference between the output power Pout of the transmission signal light output to the transmission line 91 from the wavelength conversion device 2 on the sending side and the input power Pin_r. For example, the attenuation amount setting unit 130 calculates the difference between the output power Pout and the input power Pin_r of the supervisory control signal light Ca to Cc as the power loss LOSc within the transmission line 91.

Here, the attenuation amount setting unit 130 may hold the output power Pout of the transmission signal light as a fixed value but may use the output power information. In this case, the attenuation amount setting unit 130 calculates the difference between the output power Pout indicated by the output power information and the input power Pin_r as the power loss LOSc within the transmission line 91.

This allows the attenuation amount setting unit 130 to calculate the power loss LOSc with higher accuracy than, for example, the case where the output power Pout of the transmission signal light is held as a fixed value.

The span loss includes the power loss LOSa to LOSe. Here, when the influence of the power losses LOSa, LOSb, LOSd, and LOSe on the transmission characteristics is negligibly small, the attenuation amount setting unit 130 may treat the span loss as the power loss LOSc of the transmission line 91 to set the attenuation amounts as described above, but may also set the attenuation amounts ΔPa to ΔPc for each of the VOAs 16a to 16c in consideration of the other power losses LOSa, LOSb, LOSd, and LOSe.

(Attenuation Amount Setting Approach)

Figure 7:
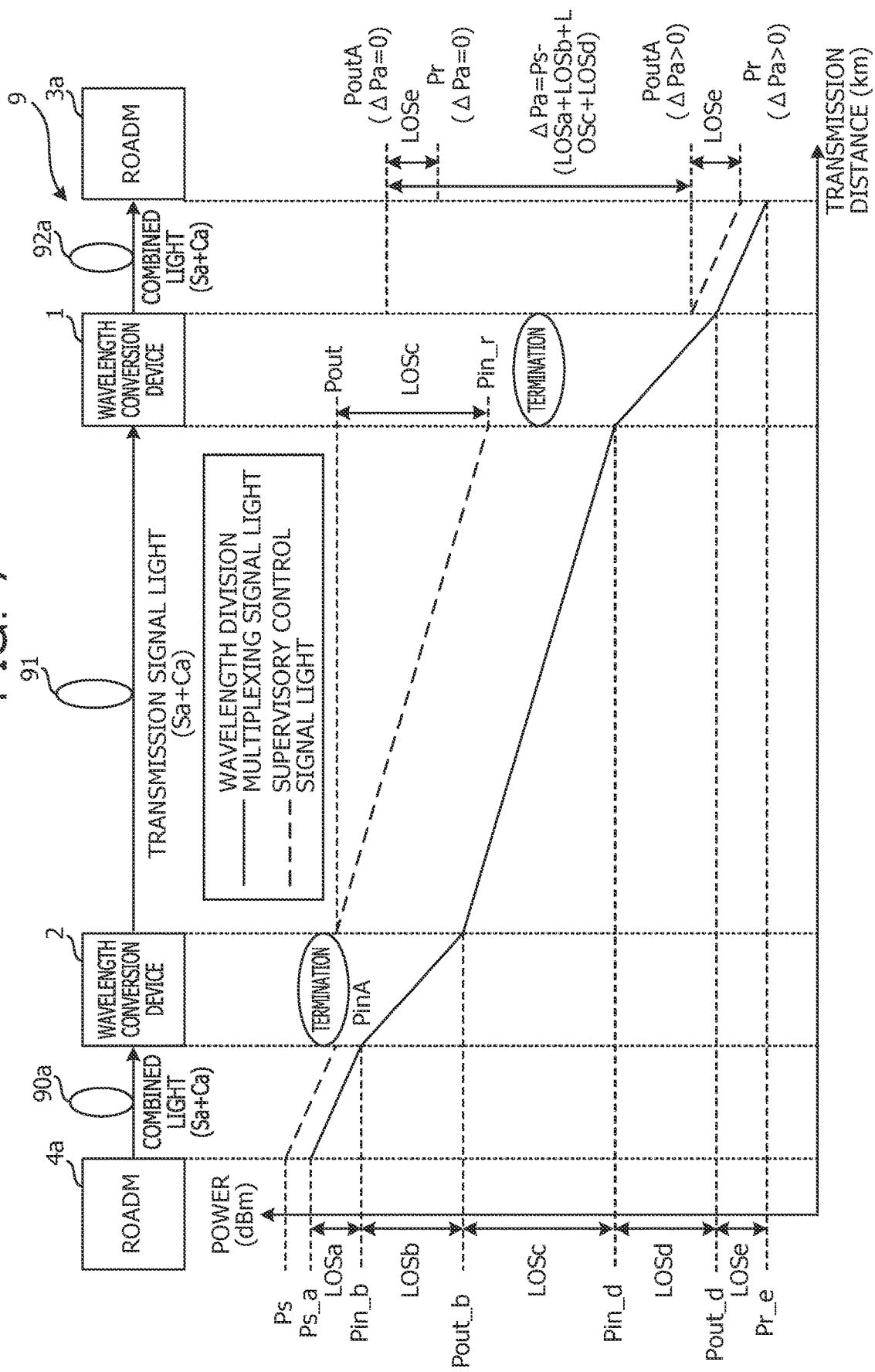
FIG. 7 is a diagram illustrating an example of a change in power with respect to a transmission distance of the wavelength division multiplexing signal light and the supervisory control signal light.

FIG. 7 is a diagram illustrating an example of a change in power with respect to a transmission distance of the wavelength division multiplexing signal light Sa and the supervisory control signal light Ca. In the present example, the wavelength division multiplexing signal light Sa and the supervisory control signal light Ca are mentioned, but the contents described below are similar for the other wavelength division multiplexing signal light Sb and Sc and supervisory control signal light Cb and Cc.

In FIG. 7, the horizontal axis indicates the transmission distance (km) along a transmission direction of the transmission signal light in the transmission system 9, and the vertical axis indicates the power (dB) of the wavelength division multiplexing signal light Sa and the supervisory control signal light Ca. Here, the power of the wavelength division multiplexing signal light Sa is illustrated by a solid line, and the power of the supervisory control signal light Ca is illustrated by a dotted line.

The power of the wavelength division multiplexing signal light Sa is reduced due to each of the power losses LOSa to LOSe in the transmission line 90a, the wavelength conversion device 2 on the sending side, the transmission line 91, and the wavelength conversion device 1 on the receiving side. Here, input power Pin_b of the wavelength division multiplexing signal light Sa input to the wavelength conversion device 2 on the sending side has a value reduced by the power loss LOSa from sending power Ps_a in the ROADM 4a on the sending side (Ps_a−LOSa). In addition, output power Pout_b of the wavelength division multiplexing signal light Sa output from the wavelength conversion device 2 has a value reduced by the power loss LOSb from the input power Pin_b (Pin_b−LOSb).

Furthermore, input power Pin_d of the wavelength division multiplexing signal light Sa input to the wavelength conversion device 1 on the receiving side has a value reduced by the power loss LOSc from the output power Pout_b (output power Pout_b−LOSc). In addition, output power Pout_d of the wavelength division multiplexing signal light Sa output from the wavelength conversion device 2 has a value reduced by the power loss LOSd from the input power Pin_d (Pin_d−LOSd). In addition, receiving power Pr_e of the wavelength division multiplexing signal light Sa received by the ROADM 3a has a value reduced by the power loss LOSe from the output power Pout_d (Pout_d−LOSe).

Meanwhile, the supervisory control signal light Ca is terminated one time by the wavelength conversion devices 2 and 1 to be converted into an electrical signal and then converted into an optical signal again. Therefore, the power losses LOSb and LOSd do not occur within the wavelength conversion devices 2 and 1. Furthermore, in the supervisory control signal light Ca, the receiving power of the ROADM 3a on the receiving side is not affected even if the power losses LOSa and LOSb occur within the transmission lines 90a and 91.

When the attenuation amount ΔPa is presumed as 0 (dB), the output power PoutA (ΔPa=0) of the supervisory control signal light Ca in the wavelength conversion device 1 is larger than the output power Pout_d of the wavelength division multiplexing signal light Sa. In this case, the receiving power Pr (ΔPa=0) (=PoutA−LOSe) of the supervisory control signal light Ca in the ROADM 3a on the receiving side is also larger than the receiving power Pr_e of the wavelength division multiplexing signal light Sa.

As described above, the ROADM 3a on the receiving side acquires the sending power Ps of the ROADM 3a on the sending side from the supervisory control information contained in the supervisory control signal light Ca. The ROADM 3a calculates the difference between the receiving power Pr and the sending power Ps of the supervisory control signal light Ca (Pr−Ps) as the span loss.

Accordingly, when the attenuation amount ΔPa is presumed as 0 (dB), the ROADM 3a will calculate the span loss as a value smaller than the span loss occurring in the wavelength division multiplexing signal light Sa. Therefore, if it is presumed that the wavelength conversion device 1 on the receiving side corrects the sending power Ps contained in the supervisory control information of the supervisory control signal light Ca according to each of the power losses LOSa to LOSd, the ROADM 3a will be able to calculate a span loss close to the span loss occurring in the wavelength division multiplexing signal light Sa.

However, for example, when the vendor of the ROADMs 3a and 4a and the vendor of the wavelength conversion devices 1 and 2 are different, the specifications of the supervisory control information sent and received between the ROADMs 3a and 4a and the specifications of the supervisory control information sent and received between the wavelength conversion devices 1 and 2 are also different. Consequently, the wavelength conversion devices 1 and 2 are not allowed to correct the sending power Ps contained in the supervisory control information of the supervisory control signal light Ca.

Accordingly, the wavelength conversion device 1 attenuates the output power PoutA of the supervisory control signal light Ca with the attenuation amount ΔPa (>0) according to the power losses LOSa to LOSd to make the output power PoutA match power reduced by the sum of the power losses LOSa to LOSd from the sending power Ps (Ps−(LOSa+LOSb+LOSc+LOSd)). This allows the ROADM 3a on the receiving side to receive the supervisory control signal light Ca at the receiving power Pr (ΔPa>0) reduced by a span loss same as the span loss of the wavelength division multiplexing signal light Sa, which is the sum of the power losses LOSa to LOSe, from the sending power Ps. Therefore, the ROADM 3a may calculate the span loss of the wavelength division multiplexing signal light Sa with the supervisory control signal light Ca.

$$\text{Pout\_}t = Ps - (LOSa + LOSb + LOSc + LOSd) = PinA - (LOSb + LOSc + LOSd) \quad (1)$$

$$\Delta Pa = PoutA - \text{Pout\_}t \quad (2)$$

The attenuation amount setting unit 130 calculates a target value Pout_t of the output power PoutA of the supervisory control signal light Ca by above formula (1). The target value Pout_t will have a value reduced by the sum of the power losses LOSb, LOSc, and LOSd from the input power PinA of the supervisory control signal light Ca in the wavelength conversion device 2 such that the output power PoutA matches power reduced by the sum of the power losses LOSa to LOSd from the sending power Ps.

In addition, the attenuation amount setting unit 130 is capable of individually calculating the target value Pout_t for the other supervisory control signal light Cb and Cc similarly to the supervisory control signal light Ca, based on the input power PinB and PinC in the wavelength conversion device 2 and the power losses LOSb, LOSc, and LOSd.

The attenuation amount setting unit 130 calculates the attenuation amount ΔPa by formula (2). The attenuation amount setting unit 130 calculates the difference between the output power PoutA detected by the photodiode 19a and the target value Pout_t as the attenuation amount ΔPa. For example, the attenuation amount setting unit 130 sets the attenuation amount ΔPa in the VOA 16a, based on the output power PoutA detected by the photodiode 19a.

Therefore, the attenuation amount setting unit 130 is capable of setting the attenuation amount ΔPa with higher accuracy than the case where the attenuation amount ΔPa is calculated with the output power PoutA as a predetermined value. Accordingly, the ROADMs 3a to 3c may measure the span loss with high accuracy. Note that, also for the other VOAs 16b and 16c, the attenuation amount setting unit 130 calculates the attenuation amounts ΔPb and ΔPc and sets the calculated attenuation amounts ΔPb and ΔPc in the VOAs 16b and 16c, respectively, based on the output power PoutB and PoutC detected by the photodiodes 19b and 19c, respectively, as in above formula (2).

As described above, the power loss LOSc within the transmission line 91 is calculated as the difference between the output power Pout of the supervisory control signal light Ca in the wavelength conversion device 2 on the sending side and the input power Pin_r of the supervisory control signal light Ca in the wavelength conversion device 1 on the receiving side.

In addition, the attenuation amount setting unit 130 may acquire the power loss LOSd within the wavelength conversion device 1 from a memory 140. Note that the attenuation amount setting unit 130 is not limited to this and may acquire the power loss LOSd from another device.

Since the attenuation amount ΔPa is set based on the power loss LOSd, the attenuation amount setting unit 130 may reflect the power loss LOSd in the output power PoutA. Accordingly, the ROADM 3a may measure the span loss including the power loss LOSd.

In addition, the attenuation amount setting unit 130 may reflect the power loss LOSd in the output power PoutB and PoutC by setting the attenuation amounts ΔPb and ΔPc, respectively, based on the power loss LOSd, as in the output power PoutA. Accordingly, the ROADMs 4a and 4b may measure the span loss including the power loss LOSd.

Furthermore, the attenuation amount setting unit 130 acquires the power loss LOSb within the wavelength conversion device 2 on the sending side from the power loss information. As described above, the imparting unit 271 reads the power loss information indicating the power loss LOSb from the memory 25 to impart the read power loss information to the multiplex data signal Emux. This allows the imparting unit 271 to include the power loss information indicating the power loss LOSb into the supervisory control frame signal light Co and notify the wavelength conversion device 1 on the receiving side of the included power loss information.

In the wavelength conversion device 1 on the receiving side, the imparted information extraction unit 121 acquires the power loss information indicating the power loss LOSb from the supervisory control frame signal Eo and notifies the attenuation amount setting unit 130 of the acquired power loss information. This allows the attenuation amount setting unit 130 to acquire the power loss LOSb.

Since the attenuation amount ΔPa is set based on the power loss LOSb, the attenuation amount setting unit 130 may reflect the power loss LOSb in the output power PoutA. Accordingly, the ROADM 3a may measure the span loss including the power loss LOSb.

In addition, the attenuation amount setting unit 130 may reflect the power loss LOSb in the output power PoutB and PoutC by setting the attenuation amounts ΔPb and ΔPc, respectively, based on the power loss LOSb, as in the output power PoutA. Accordingly, the ROADMs 4a and 4b may measure the span loss including the power loss LOSb.

As described above, in the wavelength conversion device 1 on the receiving side, the imparted information extraction unit 121 acquires the input power information indicating the input power PinA to PinC from the supervisory control frame signal Eo and notifies the attenuation amount setting unit 130 of the acquired input power information. This allows the attenuation amount setting unit 130 to acquire the input power PinA to PinC.

The attenuation amount setting unit 130 acquires the input power information from the imparted information extraction unit 121. Since the attenuation amount ΔPa for the VOA 16a is set based on the input power PinA, the attenuation amount setting unit 130 may set the attenuation amount ΔPa with higher accuracy than the case where the attenuation amount ΔPa is calculated with the input power PinA as a predetermined value. Accordingly, the ROADM 3a may measure the span loss with high accuracy.

The attenuation amount setting unit 130 sets the attenuation amounts ΔPb and ΔPc in the other VOAs 16b and 16c similarly to the VOA 16a. The attenuation amount setting unit 130 sets the attenuation amounts ΔPb and ΔPc for the VOAs 16b and 16c, based on the input power PinB and PinC indicated by the input power information, respectively.

(Span Loss Measurement Process)

Figure 8:
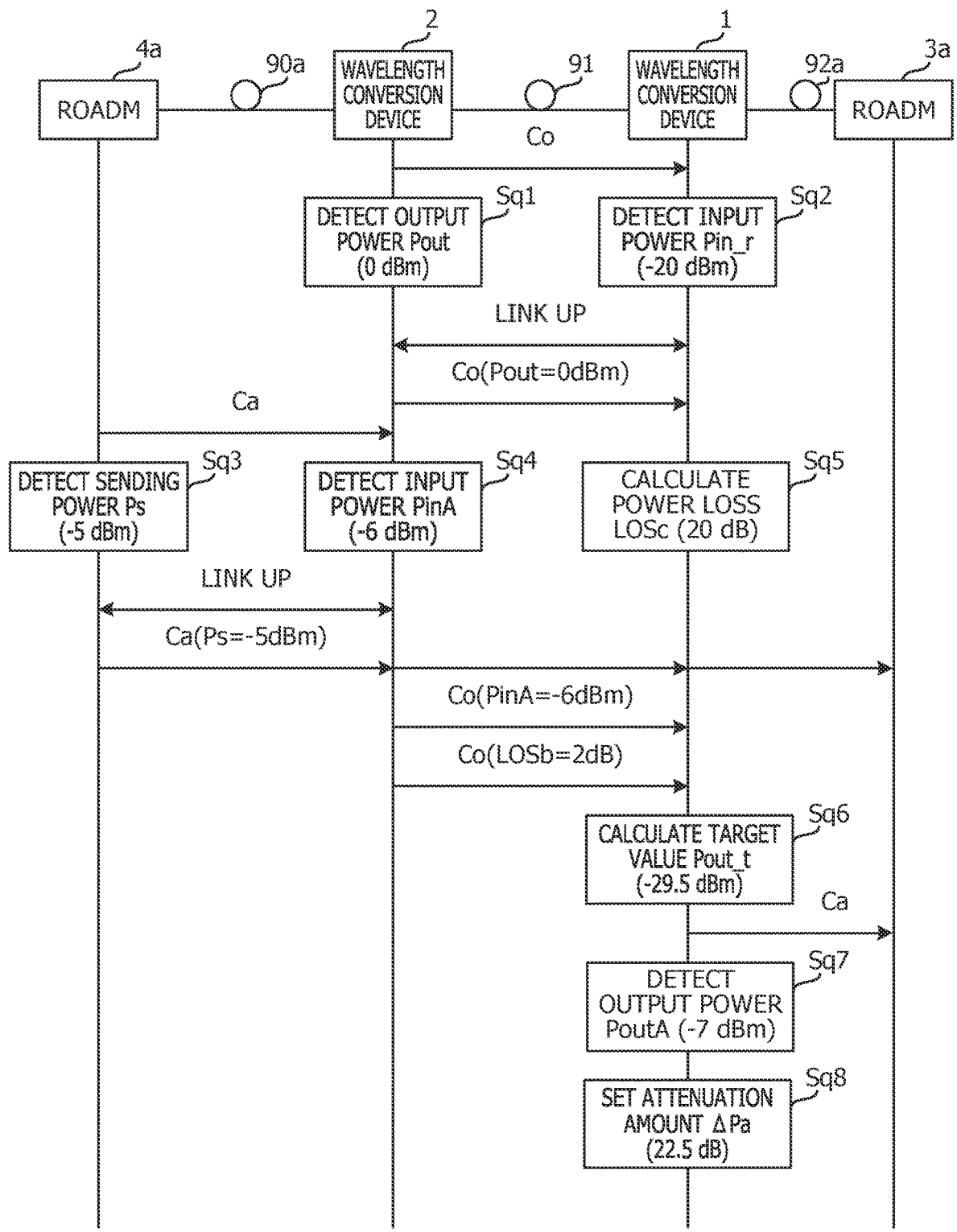
FIG. 8 is a sequence diagram (part 1) illustrating an example of a span loss measurement process in the transmission system.

FIGS. 8 and 9 are sequence diagrams illustrating an example of a span loss measurement process in the transmission system 9. In the present example, the measurement process for the span loss of the wavelength division multiplexing signal light Sa between the ROADMs 3a and 4a will be mentioned, but the measurement process for each span loss of the wavelength division multiplexing signal light Sb between the ROADMs 3b and 4b and the wavelength division multiplexing signal light Sc between the ROADMs 3c and 4c is also performed similarly to the measurement process for the span loss of the wavelength division multiplexing signal light Sa.

First, the process illustrated in FIG. 8 is executed, and then the process illustrated in FIG. 9 is executed. In addition, the present process is executed before the transmission of the wavelength division multiplexing signal light Sa to Sc is started in order to determine the gain of the preamplifier 31 before the transmission of the wavelength division multiplexing signal light Sa to Sc is started. The operations of the ROADMs 3a and 4a and the wavelength conversion devices 1 and 2 are controlled by, for example, a network supervisory control device (not depicted).

Referring to FIG. 8, the wavelength conversion device 2 on the sending side sends the supervisory control frame signal light Co to the wavelength conversion device 1 on the receiving side. At this time, the SFP transceiver 280 of the wavelength conversion device 2 outputs the supervisory control frame signal light Co to the transmission line 91.

Next, the photodiode 290 of the wavelength conversion device 2 on the sending side detects the output power Pout of the supervisory control frame signal light Co output to the transmission line 91 (reference sign Sq1). The output power Pout is assumed as 0 (dBm) as an example.

In addition, the photodiode 100 of the wavelength conversion device 1 on the receiving side detects the input power Pin_r of the supervisory control frame signal light Co input from the transmission line 91 (reference sign Sq2). The input power Pin_r is assumed as −20 (dBm) as an example.

Next, the SFP transceiver 280 of the wavelength conversion device 2 on the sending side and the SFP receiver 110 of the wavelength conversion device 1 on the receiving side mutually establish a communication link by the supervisory control frame signal light Co (refer to "link up").

Next, the wavelength conversion device 2 on the sending side sends the supervisory control frame signal light Co containing the output power information on the output power Pout=0 (dBm) to the wavelength conversion device 1 on the receiving side. At this time, the imparting unit 271 of the wavelength conversion device 2 imparts the output power information on the output power Pout=0 (dBm) to the multiplex data signal Emux (containing only the data signal Ea). The SFP transceiver 280 converts the supervisory control frame signal Eo containing the multiplex data signal Emux and the output power information into the supervisory control frame signal light Co to send the converted supervisory control frame signal light Co to the wavelength conversion device 1 on the receiving side. The wavelength conversion device 1 on the receiving side acquires the output power Pout from the supervisory control frame signal light Co.

Next, the ROADM 4a on the sending side sends the supervisory control signal light Ca to the wavelength conversion device 2 on the sending side. At this time, the photodiode 45 of the ROADM 4a detects the sending power Ps of the supervisory control signal light Ca to be sent to the wavelength conversion device 2 via the transmission line 90a (reference sign Sq3). The sending power Ps is assumed as −5 (dBm) as an example.

In addition, the photodiode 21a of the wavelength conversion device 2 on the sending side detects the input power PinA of the supervisory control signal light Ca input from the transmission line 90a (reference sign Sq4). The input power PinA is assumed as −6 (dBm) as an example.

The attenuation amount setting unit 130 of the wavelength conversion device 1 on the receiving side calculates the difference between the output power Pout and the input power Pin_r as the power loss LOSc within the transmission line 91 (reference sign Sq5). For example, the power loss LOSc is 20 (dB) (=0−(−20)).

Next, the SFP transceiver 44 of the ROADM 4a on the sending side and the SFP receiver 110 of the wavelength conversion device 2 on the sending side mutually establish a communication link by the supervisory control signal light Ca (refer to "link up").

Next, the ROADM 4a on the sending side sends the supervisory control signal light Ca containing the supervisory control information indicating the sending power Ps=−5 (dBm) to the ROADM 3a on the receiving side by way of the wavelength conversion devices 1 and 2. As described above, the OSC receiving unit 34 of the ROADM 3a is capable of identifying the data signal Ea from the supervisory control signal light Ca and acquiring the sending power Ps.

Next, the wavelength conversion device 2 on the sending side sends the supervisory control frame signal light Co containing the input power information indicating the input power PinA=−6 (dBm) to the wavelength conversion device 1 on the receiving side. At this time, the imparting unit 271 of the wavelength conversion device 2 imparts the input power information to the data signal Ea and outputs the imparted input power information to the SFP transceiver 280 as the supervisory control frame signal Eo.

Next, the wavelength conversion device 2 on the sending side sends the supervisory control frame signal light Co containing the power loss information indicating the power loss LOSb=2 (dB) within the wavelength conversion device 2 to the wavelength conversion device 1 on the receiving side. At this time, the imparting unit 271 of the wavelength conversion device 2 imparts the power loss information to the data signal Ea and outputs the imparted power loss information to the SFP transceiver 280 as the supervisory control frame signal Eo. The wavelength conversion device 1 on the receiving side acquires the input power information (PinA) and the power loss information (LOSb) from the supervisory control frame signal light Co.

Next, the attenuation amount setting unit 130 of the wavelength conversion device 1 on the receiving side calculates the target value Pout_t of the output power PoutA of the supervisory control signal light Ca from the input power PinA and the power losses LOSb, LOSc, and LOSd based on above formula (1) (reference sign Sq6). Here, the attenuation amount setting unit 130 acquires the power loss LOSd (for example, 1.5 (dB)) from the memory 140. For example, the target value Pout_t is −29.5 (dBm) (=−6−(2+20+1.5)).

Next, the wavelength conversion device 1 on the receiving side sends the supervisory control signal light Ca to the ROADM 3a. At this time, the SFP transceiver 15a of the wavelength conversion device 1 generates the supervisory control signal light Ca to output the generated supervisory control signal light Ca to the transmission line 92a.

In addition, the photodiode 19a of the wavelength conversion device 1 on the receiving side detects the output power PoutA of the supervisory control signal light Ca output to the transmission line 92a (reference sign Sq7). The output power PoutA is assumed as −7 (dBm) as an example.

Next, the attenuation amount setting unit 130 of the wavelength conversion device 1 on the receiving side calculates the attenuation amount ΔPa based on above formula (2) to set the calculated attenuation amount ΔPa in the VOA 16a (reference sign Sq8). The attenuation amount ΔPa is, for example, 22.5 (dB) (=−7−(−29.5)).

Referring to FIG. 9, next, the wavelength conversion device 1 on the receiving side sends the supervisory control signal light Ca to the ROADM 3a. At this time, the SFP transceiver 15a of the wavelength conversion device 1 generates the supervisory control signal light Ca to output the generated supervisory control signal light Ca to the transmission line 92a. Since the output power PoutA of the supervisory control signal light Ca is reduced by the attenuation amount ΔPa (22.5 (dB)), the output power PoutA coincides with −29.5 (dBm), which is the target value Pout_t.

Next, the photodiode 33 of the ROADM 3a on the receiving side detects the receiving power Pr of the supervisory control signal light Ca received from the wavelength conversion device 2 (reference sign Sq8). The receiving power Pr is −29.5 (dBm), which is the same as the output power PoutA, assuming that the power loss of the transmission line 92a is 0 (dB), for example.

Next, the OSC receiving unit 34 of the ROADM 3a on the receiving side calculates the span loss of the wavelength division multiplexing signal light Sa as the difference between the sending power Ps and the receiving power Pr (reference sign Sq9). Here, the OSC receiving unit 34 acquires the sending power Ps from the supervisory control information of the data signal Ea. The span loss of the wavelength division multiplexing signal light Sa is, for example, 24.5 (dB) (=−5−(−29.5)).

Next, the OSC receiving unit 34 of the ROADM 3a on the receiving side sets the gain of the preamplifier 31 based on the span loss (reference sign Sq10). As described above, the OSC receiving unit 34 selects one of the high-gain amplification unit 311 and the low-gain amplification unit 312 according to, for example, the comparison result between the span loss and the threshold value.

Next, the OSC receiving unit 34 of the ROADM 3a on the receiving side starts up the preamplifier 31 (reference sign Sq11). This allows the preamplifier 31 to amplify the wavelength division multiplexing signal light Sa with an appropriate gain according to the span loss. In this manner, the span loss measurement process is performed.

The embodiments described above are examples of preferred embodiments. However, the embodiments are not limited to these examples, and a variety of modifications may be made and carried out without departing from the gist of the present embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength conversion device comprising:
   a first demultiplexing circuit configured to receive transmission signal light in which first wavelength division multiplexing signal light and second wavelength division multiplexing signal light that have different wavelength bands in which a plurality of rays of main signal light is wavelength-multiplexed are combined with supervisory control signal light that relates to supervisory control of the first wavelength division multiplexing signal light and the second wavelength division multiplexing signal light from a transmission line and that demultiplexes the supervisory control signal light from the transmission signal light;
   a first power detection circuit configured to detect input power of the supervisory control signal light;
   a second demultiplexing circuit configured to demultiplex each of the first wavelength division multiplexing signal light and the second wavelength division multiplexing signal light from the transmission signal light;
   a wavelength conversion circuit configured to convert at least one of the wavelength bands of the first wavelength division multiplexing signal light and the second wavelength division multiplexing signal light into another wavelength band;
   a photoelectric conversion circuit configured to convert the supervisory control signal light into an electrical signal;
   an acquisition circuit configured to acquire a first information signal and a second information signal that contain supervisory control information of the first wavelength division multiplexing signal light and the second wavelength division multiplexing signal light, respectively, from the electrical signal;
   a first signal conversion circuit configured to convert the first information signal into first information signal light;
   a second signal conversion circuit configured to convert the second information signal into second information signal light;
   a first variable optical attenuator circuit configured to attenuate the first information signal light; attenuate the second information signal light;

a first combining circuit configured to combine the first information signal light attenuated by the first variable optical attenuator and the first wavelength division multiplexing signal light, and outputs the combined first information signal light and first wavelength division multiplexing signal light to a receiving device;

a second combining circuit configured to combine the second information signal light attenuated by the second variable optical attenuator and the second wavelength division multiplexing signal light, and outputs the combined second information signal light and second wavelength division multiplexing signal light to another receiving device; and a setting circuit configured to calculate a power loss of the supervisory control signal light within the transmission line from the input power of the supervisory control signal light, and sets an attenuation amount based on the power loss of the supervisory control signal light in each of the first variable optical attenuator and the second variable optical attenuator.

2. The wavelength conversion device according to claim 1, wherein output power information that indicates output power of the supervisory control signal light output to the transmission line is imparted to the first information signal and the second information signal, the acquisition circuit acquires the first information signal and the second information signal, and the output power information from the electrical signal, and the setting circuit calculates the power loss from a difference between the output power indicated by the output power information and the input power of the supervisory control signal light.

3. The wavelength conversion device according to claim 1, further comprising:

a second power detection circuit is configured to detect power of the first information signal light attenuated by the first variable optical attenuator, wherein the setting circuit sets the attenuation amount in the first variable optical attenuator, based on the detected power detected and the power loss of the supervisory control signal light within the transmission line.

4. The wavelength conversion device according to claim 1, wherein power loss information that indicates the power loss of the first wavelength division multiplexing signal light within an output source device that outputs the transmission signal light to the transmission line is imparted to the first information signal and the second information signal, the acquisition circuit acquires the first information signal and the second information signal, and the power loss information from the electrical signal, and the setting circuit sets the attenuation amount, based on the power loss indicated by the power loss information and the power loss of the supervisory control signal light within the transmission line.

5. The wavelength conversion device according to claim 1, wherein the setting circuits sets the attenuation amount, based on the power loss of the first wavelength division multiplexing signal light within the wavelength conversion device and the power loss of the supervisory control signal light within the transmission line.

6. The wavelength conversion device according to claim 1, wherein input power information that indicates the input power of the first information signal light and the second information signal light input to an output source device that outputs the transmission signal light to the transmission line is imparted to the first information signal and the second information signal, the acquisition circuit acquires the first information signal and the second information signal, and the input power information from the electrical signal, and the setting circuit sets the attenuation amount, based on the input power indicated by the input power information and the power loss of the supervisory control signal light within the transmission line.

7. A transmission system comprising:

a first wavelength conversion device configured to receive transmission signal light in which first wavelength division multiplexing signal light and second wavelength division multiplexing signal light that have different wavelength bands in which a plurality of rays of main signal light is wavelength-multiplexed are combined with supervisory control signal light that relates to supervisory control of the first wavelength division multiplexing signal light and the second wavelength division multiplexing signal light is input from a transmission line; and a receiving device including a second processor configured to receive the first wavelength division multiplexing signal light, wherein the first wavelength conversion device includes:

a first demultiplexing circuit that demultiplexes the supervisory control signal light from the transmission signal light;

a first power detection circuit that detects input power of the supervisory control signal light;

a second demultiplexing circuit that demultiplexes each of the first wavelength division multiplexing signal light and the second wavelength division multiplexing signal light from the transmission signal light;

a first wavelength conversion circuit that converts at least one of the wavelength bands of the first wavelength division multiplexing signal light and the second wavelength division multiplexing signal light into another wavelength band;

a photoelectric conversion circuit that converts the supervisory control signal light into an electrical signal;

an acquisition circuit that acquires a first information signal and a second information signal that contain supervisory control information of the first wavelength division multiplexing signal light and the second wavelength division multiplexing signal light, respectively, from the electrical signal;

a first signal conversion circuit that converts the first information signal into first information signal light;

a second signal conversion circuit that converts the second information signal into second information signal light;

a first variable optical attenuator that attenuates the first information signal light;

a second variable optical attenuator that attenuates the second information signal light;

a first combining circuit that combines the first information signal light attenuated by the first variable optical attenuator and the first wavelength division multiplexing signal light, and outputs the combined first information signal light and first wavelength division multiplexing signal light to the receiving device;

a second combining circuit that combines the second information signal light attenuated by the second variable optical attenuator and the second wavelength division multiplexing signal light, and outputs the combined second information signal light and second wavelength division multiplexing signal light to another receiving device; and a first setting circuit that calculates a power loss of the supervisory control signal light within the transmission line from the input power of the supervisory control signal light, and sets an attenuation amount based on the power loss of the supervisory control signal light in each of the first variable optical attenuator and the second variable optical attenuator, and the receiving device includes:

a third demultiplexing circuit that demultiplexes each of the first information signal light and the first wavelength division multiplexing signal light from combined light input from the first combining circuit;

a receiving power detection circuit that detects receiving power of the first information signal light;

an optical amplifier that amplifies the demultiplexed first wavelength division multiplexing signal light; and a second setting circuit that sets a gain of the optical amplifier, based on the detected receiving power.

8. The transmission system according to claim 7, further comprising a second wavelength conversion device that outputs the transmission signal light to the transmission line, wherein the second wavelength conversion device includes:

a second wavelength conversion circuit that converts at least one of the wavelength bands of the first wavelength division multiplexing signal light and the second wavelength division multiplexing signal light such that the wavelength bands of the first wavelength division multiplexing signal light and the second wavelength division multiplexing signal light are different;

a first generation circuit that generates a multiplex signal by multiplexing the first information signal and the second information signal;

a multiplex signal conversion circuit that converts the multiplex signal into the supervisory control signal light; and a third combining circuit that generates the transmission signal light by combining the first wavelength division multiplexing signal light and the second wavelength division multiplexing signal light, and the supervisory control signal light, and outputs the generated transmission signal light to the transmission line.

9. The transmission system according to claim 8, further comprising a sending device that sends the combined light of the first wavelength division multiplexing signal light and a third information signal light to the second wavelength conversion device, wherein the sending device includes:

a sending power detection circuit that detects sending power of the third information signal light sent to the second wavelength conversion device;

a second generation circuit that generates the third information signal light that contains the supervisory control information that indicates the sending power detected by the sending power detection circuit; and a fourth combining circuit that combines the third information signal light and the first wavelength division multiplexing signal light, and outputs the combined third information signal light and first wavelength division multiplexing signal light to the second wavelength conversion device, and the second setting circuit sets the gain of the optical amplifier, based on a difference between the receiving power detected by the receiving power detection circuit and the sending power indicated by the supervisory control information.

10. The transmission system according to claim 9, wherein the second wavelength conversion device includes:

a third power detection circuit that detects the input power of the first information signal light and the second information signal light input from the sending device; and an imparting circuit that imparts input power information that indicates the input power detected by the third power detection circuit to the multiplex signal; and the acquisition circuit acquires the first information signal and the second information signal, and the input power information from the electrical signal, and the first setting circuit sets the attenuation amount, based on the input power indicated by the input power information and the power loss of the supervisory control signal light within the transmission line.

11. The transmission system according to claim 10, wherein the imparting circuit imparts output power information that indicates output power of the supervisory control signal light output to the transmission line, to the multiplex signal, the acquisition circuit acquires the first information signal and the second information signal, and the output power information from the electrical signal, and the first setting circuit calculates the power loss from a difference between the output power indicated by the output power information and the input power of the supervisory control signal light.

12. The transmission system according to claim 10, wherein the imparting circuit imparts power loss information that indicates the power loss of the first wavelength division multiplexing signal light within the second wavelength conversion device to the multiplex signal, extracts the first information signal and the second information signal, and the power loss information from the electrical signal, and the first setting circuit sets the attenuation amount, based on the power loss indicated by the power loss information and the power loss of the supervisory control signal light within the transmission line.

13. The transmission system according to claim 7, wherein the first wavelength conversion device includes a second power detection circuit that detects power of the first information signal light attenuated by the first variable optical attenuator, and the first setting circuit sets the attenuation amount in the first variable optical attenuator, based on the power detected by the second power detection circuit and the power loss of the supervisory control signal light within the transmission line.

14. The transmission system according to claim 7, wherein the first setting circuit sets the attenuation amount, based on the power loss of the first wavelength division multiplexing signal light within the first wavelength conversion device and the power loss of the supervisory control signal light within the transmission line.

* * * * *